April 30, 1963 R. P. SHAW 3,087,840
METHODS AND MEANS FOR PRODUCING PHYSICAL, CHEMICAL AND
PHYSICO-CHEMICAL EFFECTS BY LARGE-AMPLITUDE
SOUND WAVES
Filed June 16, 1958 10 Sheets-Sheet 1
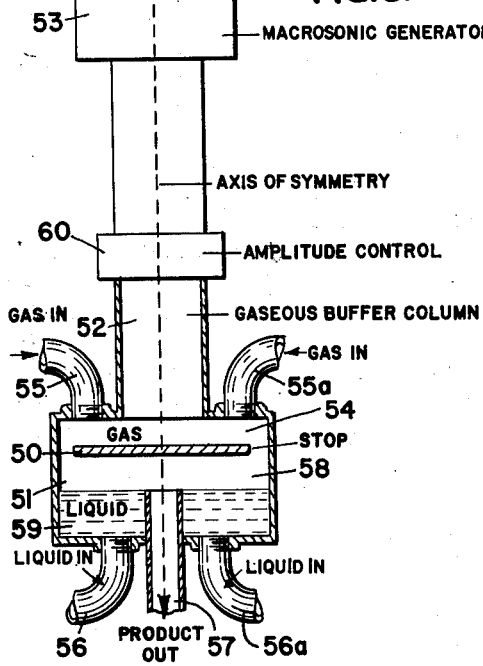
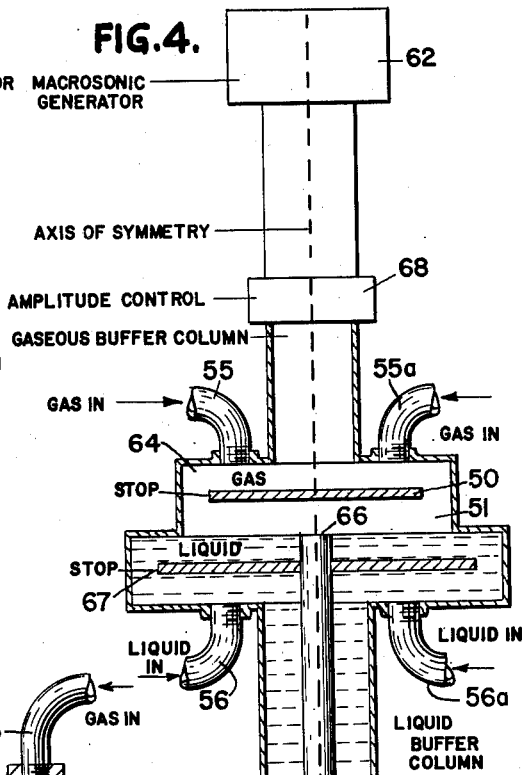
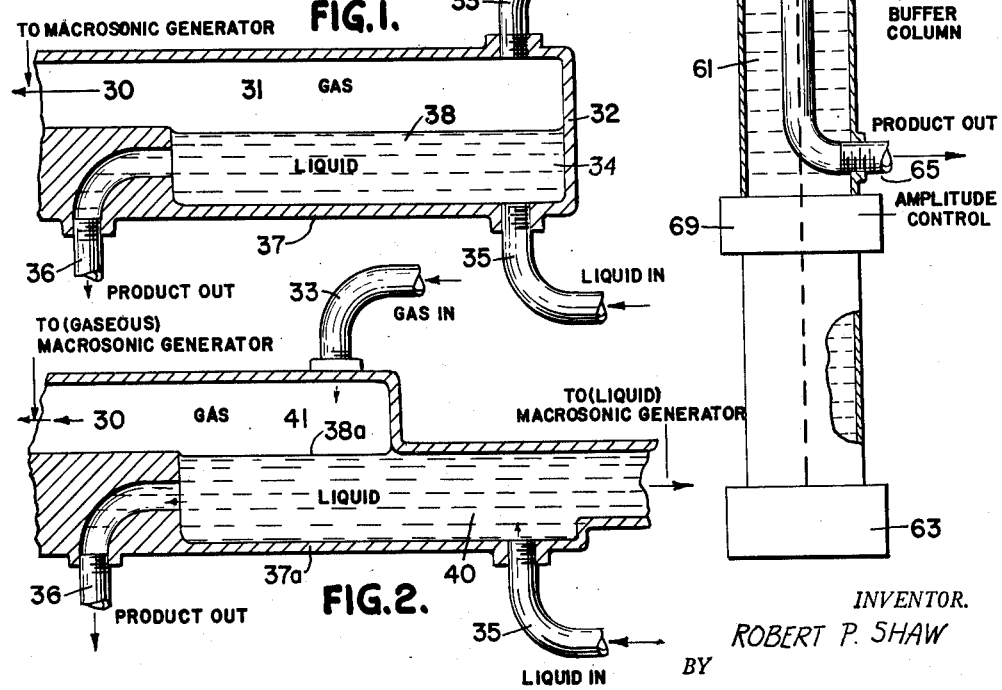
INVENTOR.
ROBERT P. SHAW
BY
MAXWELL E. SPARROW
ATTORNEY

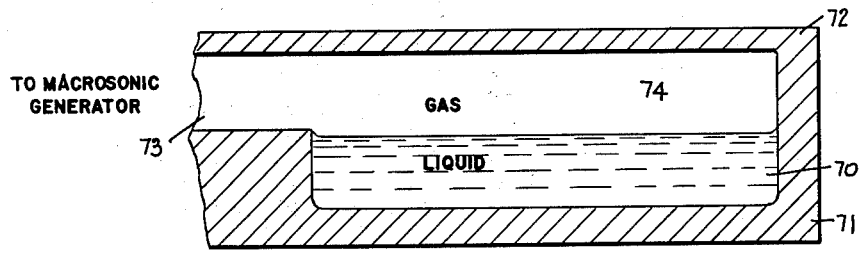
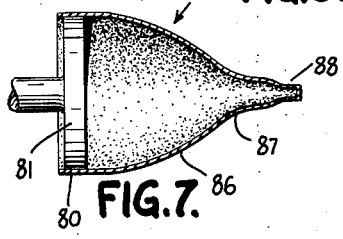
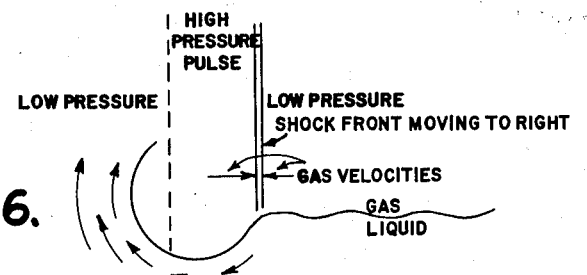
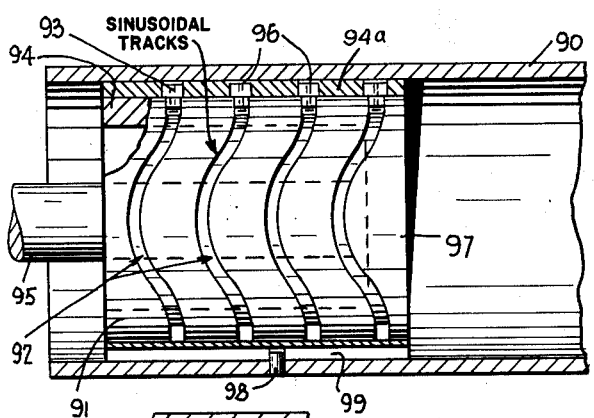
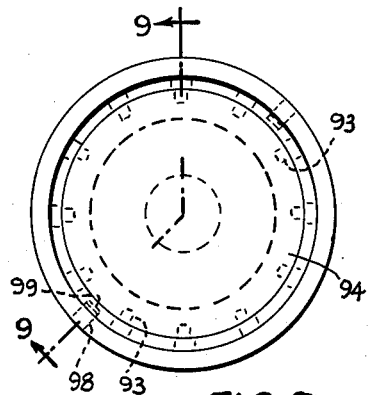
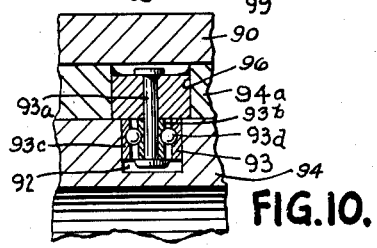

April 30, 1963 R. P. SHAW 3,087,840
METHODS AND MEANS FOR PRODUCING PHYSICAL, CHEMICAL AND
PHYSICO-CHEMICAL EFFECTS BY LARGE-AMPLITUDE
SOUND WAVES
Filed June 16, 1958 10 Sheets-Sheet 3
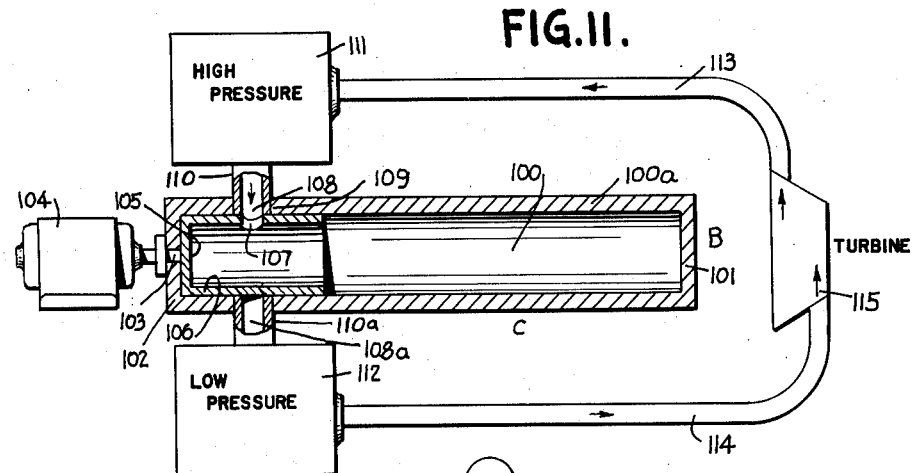
FIG.11.
FIG.11A.
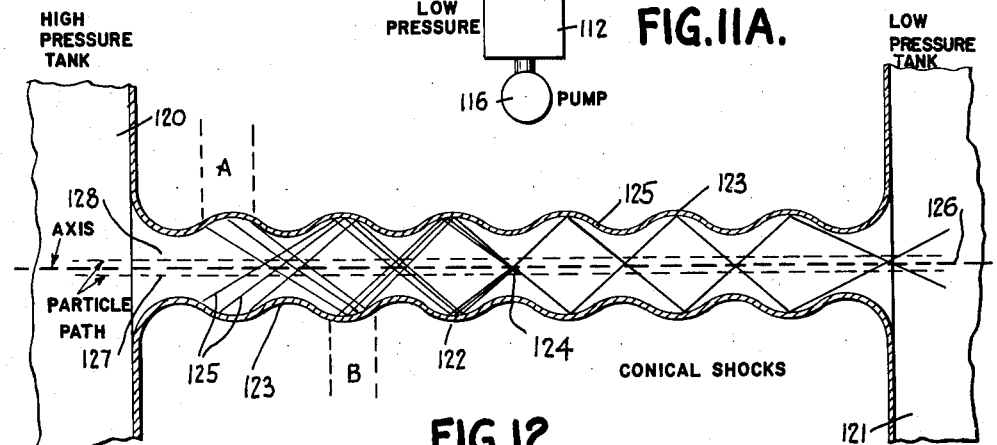
FIG.12.
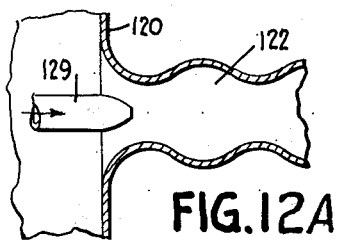
FIG.12A
INVENTOR.
ROBERT P. SHAW.
BY
MAXWELL E. SPARROW.
ATTORNEY.

VALVE ACTION RELATION TO PROGRESSION OF SHOCK WAVE

INVENTOR.
ROBERT P. SHAW
BY
MAXWELL E. SPARROW.
ATTORNEY.

April 30, 1963
R. P. SHAW
3,087,840
METHODS AND MEANS FOR PRODUCING PHYSICAL, CHEMICAL AND
PHYSICO-CHEMICAL EFFECTS BY LARGE-AMPLITUDE
SOUND WAVES
Filed June 16, 1958
10 Sheets-Sheet 5
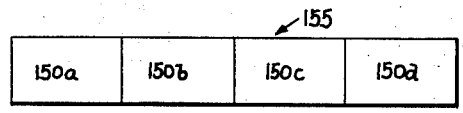
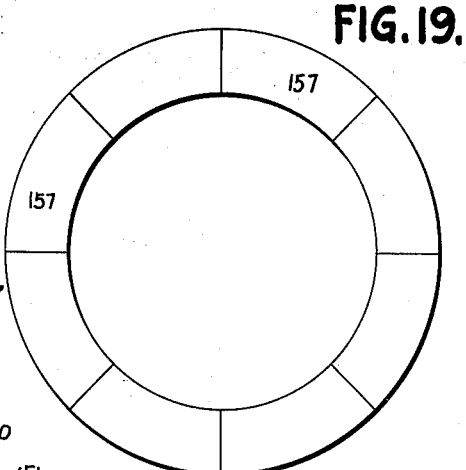
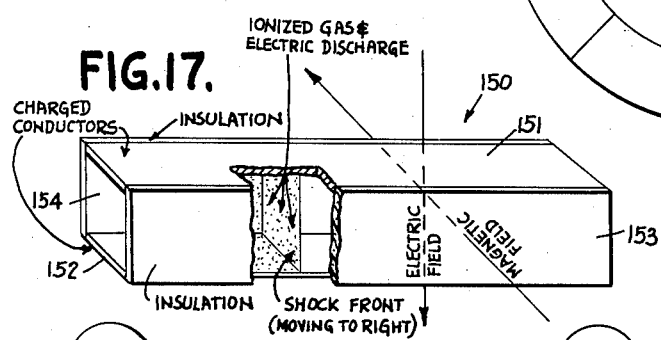
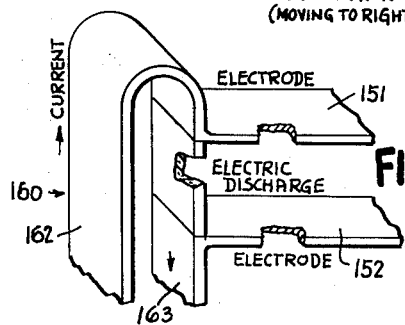
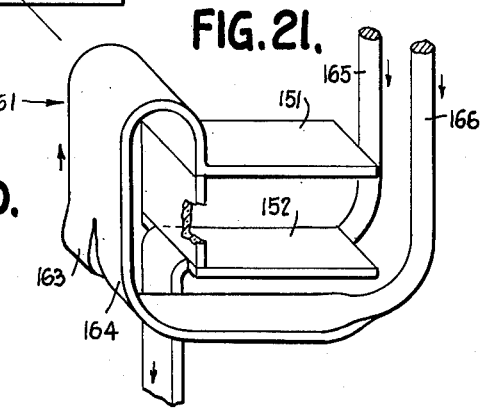
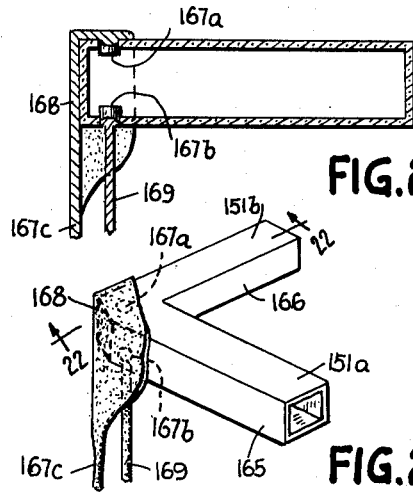
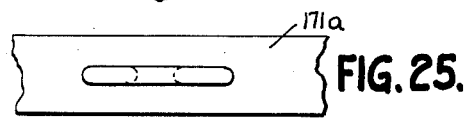
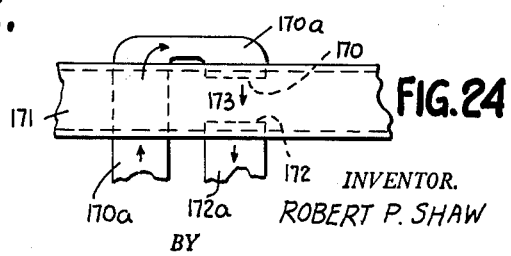
INVENTOR.
ROBERT P. SHAW
BY
MAXWELL E. SPARROW
ATTORNEY.

April 30, 1963 R. P. SHAW 3,087,840
METHODS AND MEANS FOR PRODUCING PHYSICAL, CHEMICAL AND
PHYSICO-CHEMICAL EFFECTS BY LARGE-AMPLITUDE
SOUND WAVES
Filed June 16, 1958 10 Sheets-Sheet 6
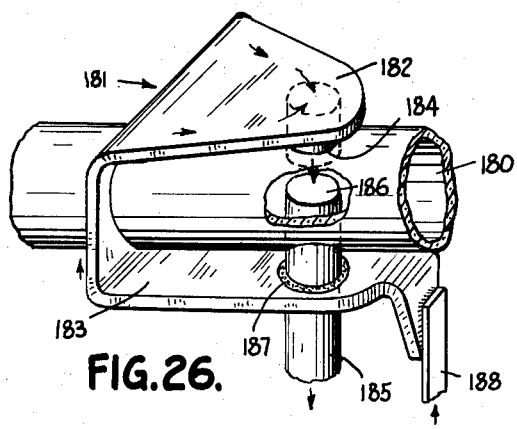
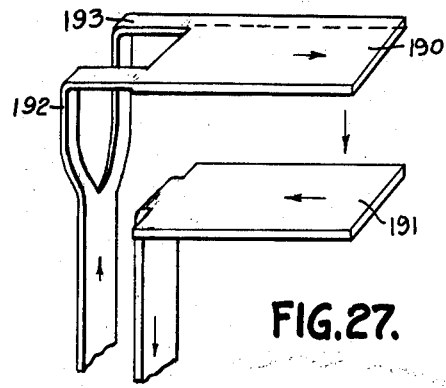
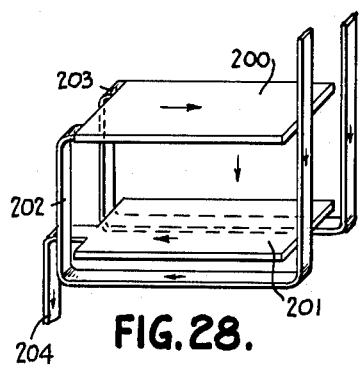
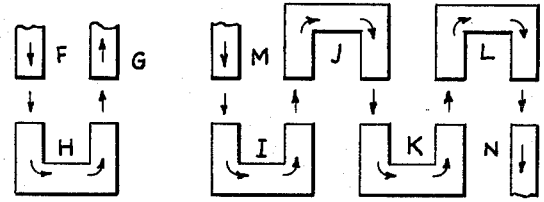
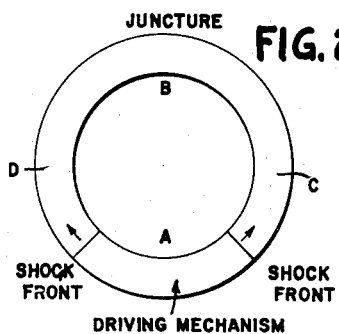
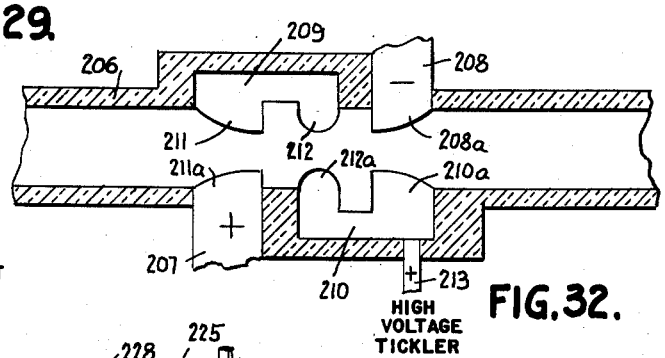
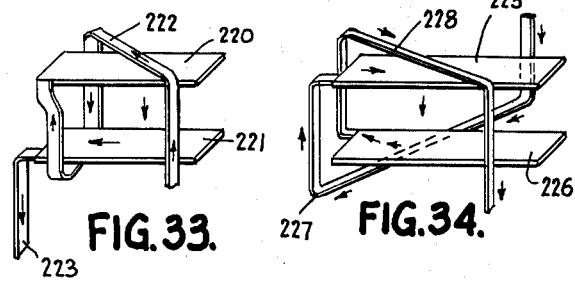
INVENTOR.
ROBERT P. SHAW
BY
MAXWELL E. SPARROW
ATTORNEY.

April 30, 1963 R. P. SHAW 3,087,840
METHODS AND MEANS FOR PRODUCING PHYSICAL, CHEMICAL AND
PHYSICO-CHEMICAL EFFECTS BY LARGE-AMPLITUDE
SOUND WAVES
Filed June 16, 1958 10 Sheets-Sheet 7
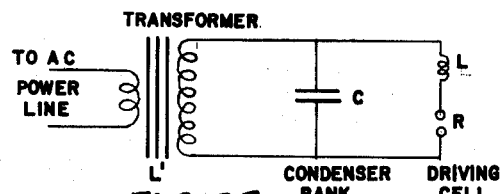
FIG. 35.
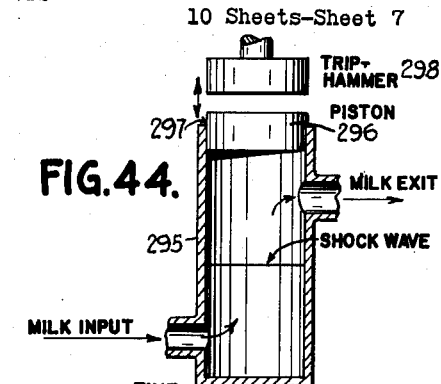
FIG. 44.
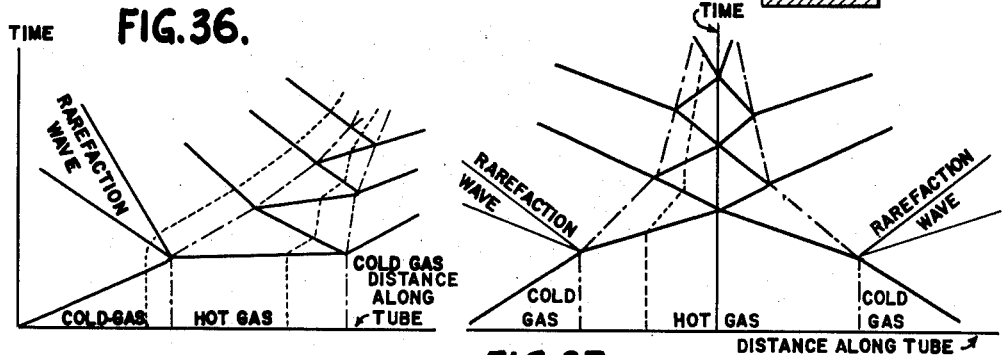
FIG. 36. FIG. 37.
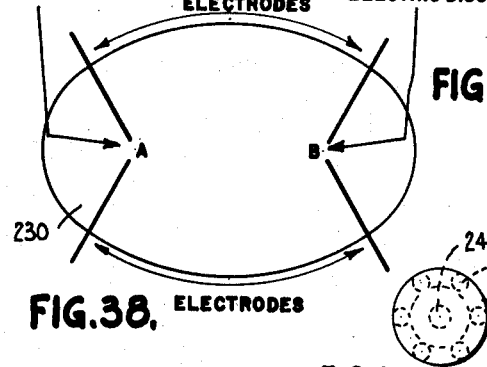
FIG. 38.
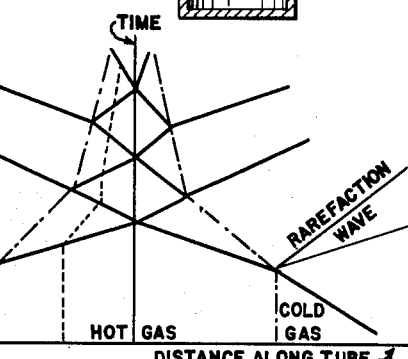
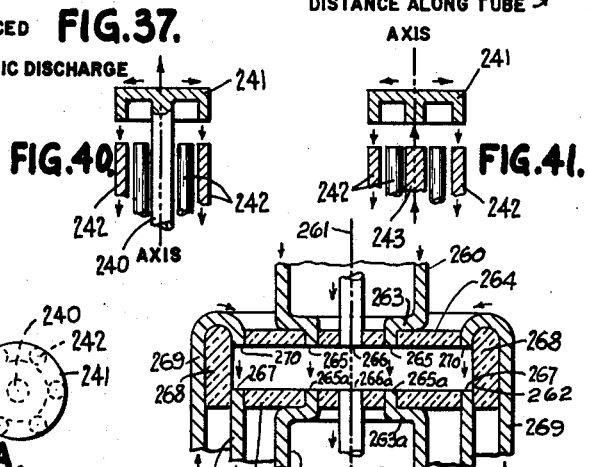
FIG. 40. FIG. 41.
FIG. 40A.
FIG. 42.
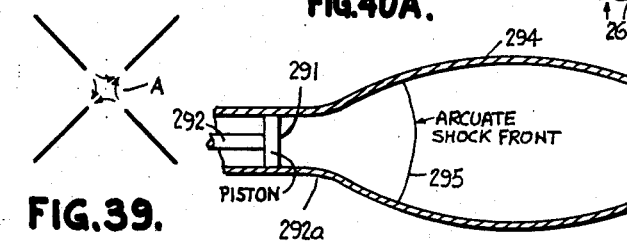
FIG. 39. FIG. 43.
INVENTOR.
ROBERT P. SHAW
BY
MAXWELL E. SPARROW.
ATTORNEY.

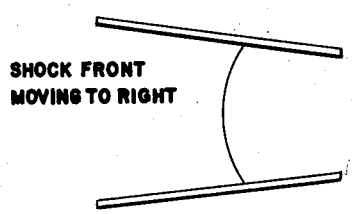
FIG.45.
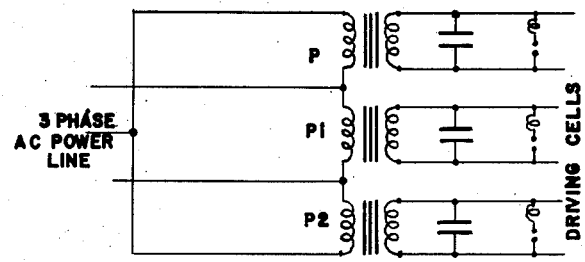
FIG.46.
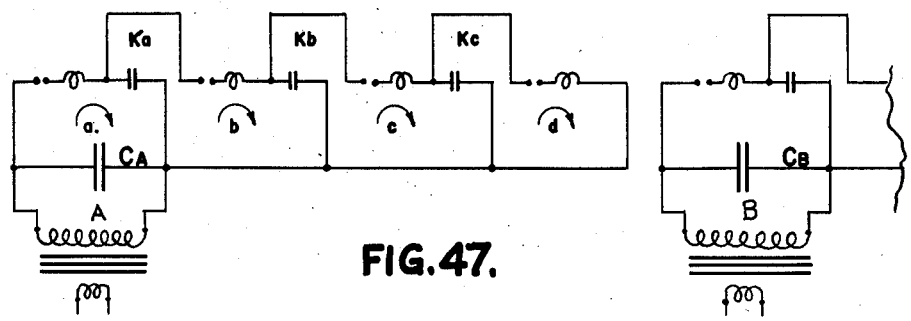
FIG.47.
FIG.48.
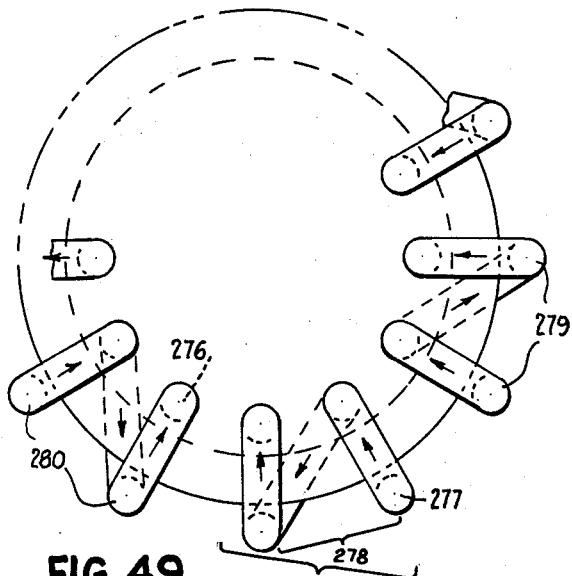
FIG.49.
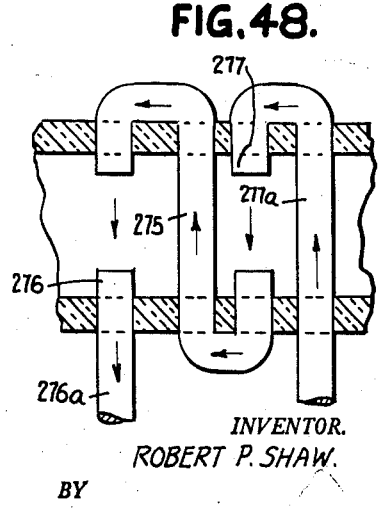
INVENTOR.
ROBERT P. SHAW.
BY
MAXWELL E. SPARROW.
ATTORNEY.

April 30, 1963  R. P. SHAW  3,087,840
METHODS AND MEANS FOR PRODUCING PHYSICAL, CHEMICAL AND
PHYSICO-CHEMICAL EFFECTS BY LARGE-AMPLITUDE
SOUND WAVES
Filed June 16, 1958  10 Sheets-Sheet 9
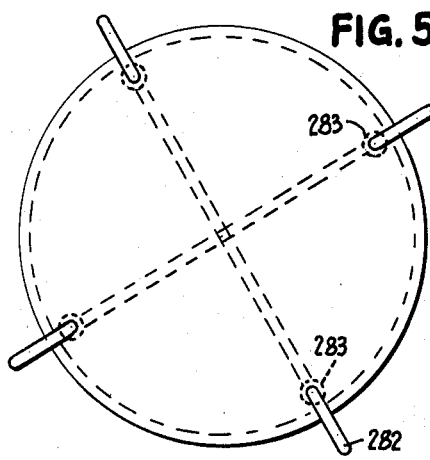
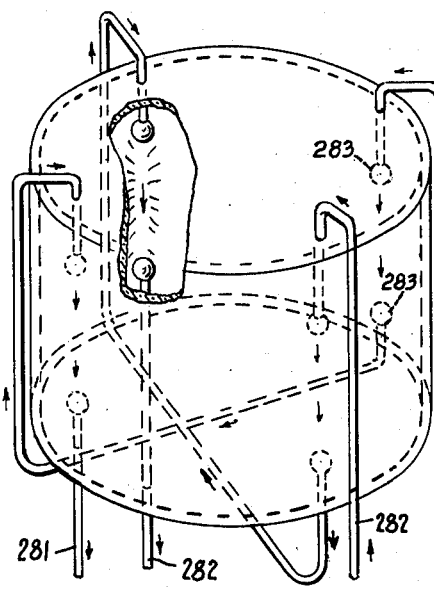
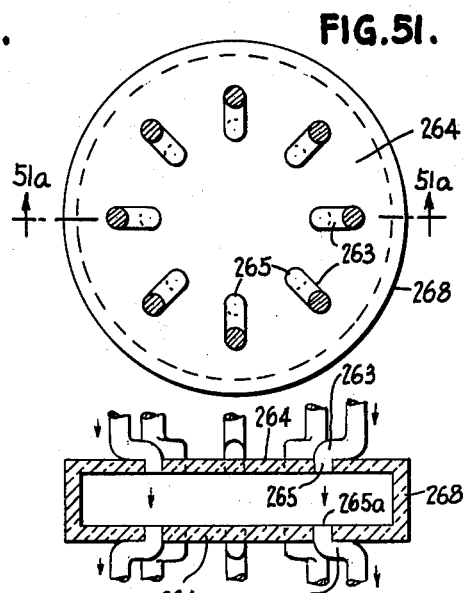
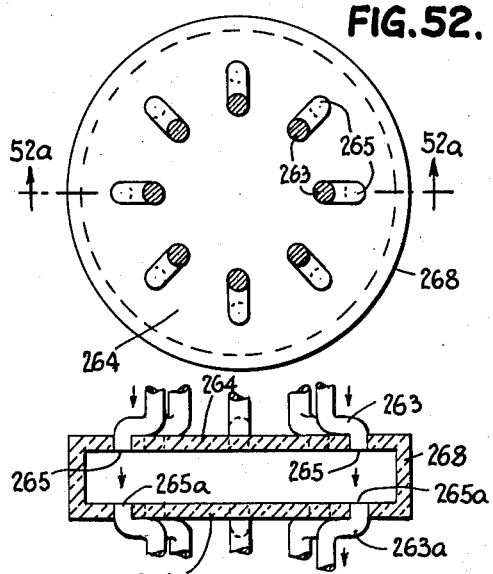
INVENTOR.
ROBERT P. SHAW.
BY
MAXWELL E. SPARROW.
ATTORNEY.

INVENTOR.
ROBERT P. SHAW.
BY
MAXWELL E. SPARROW
ATTORNEY.

United States Patent Office 3,087,840
Patented Apr. 30, 1963

3,087,840
METHODS AND MEANS FOR PRODUCING PHYSICAL, CHEMICAL AND PHYSICO-CHEMICAL EFFECTS BY LARGE-AMPLITUDE SOUND WAVES
Robert P. Shaw, New York, N.Y., assignor to Macrosonic Process Corporation, New York, N.Y., a corporation of Delaware
Filed June 16, 1958, Ser. No. 742,301
3 Claims. (Cl. 134—1)

This invention relates to the application of large-amplitude sound waves as a means of producing physical, chemical and physico-chemical effects in an insonation system.

I have found that the effect of exposure of two or more fluids to large-amplitude sound waves incorporating periodic shocks causes a violent agitation and interspersion of the particles of the fluids, such that there is brought about by such action emulsions, or partial or complete inversion of emulsions, homogenization, compounding, and the promotion, acceleration and control of chemical reactions, and the production of ultra-high temperatures. Sulfonation or nitration of organic compounds often occurs in heterogeneous and highly viscous media. To promote these reactions, it is essential that during the reaction time the mixture is well worked through to ensure that the reaction and temperature be uniform, and that the reaction be sufficiently rapid to prevent the formation of nuisance by-products. In many instances, temperatures and reactions are not uniform; side reactions are unavoidable. In addition, the necessary set of apparatus is often very complicated, has a tendency to require frequent repairs, and has an uneconomically high power requirement.

It is well known that uniformity of reaction and, particularly in the case of highly exothermic or endothermic reactions, uniformity of temperature can best be achieved by violent agitation of the reactants. Uniform agitation is difficult to accomplish by mechanical means, which may also cause localized overheating owing to friction between liquids and the moving mechanical parts and improper heat transfer. Moreover, the presence of such mechanical parts may present complications in the processing of corrosive substances. On the other hand, the small amplitude and low energy of the waves of ultrasonics or of ordinary sound renders acoustic devices unsuitable when the fluids in question are viscous or when the waves must propagate through gases, owing to rapid attenuation.

These difficulties are overcome with the use of large-amplitude sound waves (now known as macrosonics and referred to in the specification by that name). Under the impact of these periodic shock waves upon a liquid surface, the gas-liquid interface is enormously extended, guttated, through the formation of a spray of minute droplets. In a conveniently arranged enclosure (guttation chamber) not only this effect of macrosonics is made to occur, but the gas-liquid mixture experiences an excessively violent agitation and circulation as well. All these circumstances are, of course, of greatest importance to the speedy and uniform completion of chemical reactions.

Macrosonics is the recently developed technology of sound waves with displacements up to a hundred thousand or more times as large as those of ordinary sound waves or ultrasonics. In contrast to these more familiar forms of sound energy, the pressure variations in macrosonic waves are of extremely high magnitude.

One of the unique features of the new method of generating large-amplitude sound is that considerable energy is fed into the wave with each cycle so that the amplitude of the wave continues to increase until dissipation halts further increase of amplitude. Thereafter, the waves continue to oscillate indefinitely with this uniform peak amplitude.

This effect and result are achieved by the periodic shock tube. Periodic shock tubes operate on a new principle (macrosonic resonance) which may be most simply explained using the case of a piston-driven tube as an example.

The theory has been established by applicant that if a large-amplitude compression wave in a gas collides with a moving piston, it is weakened if the piston is accelerating away from the gas, while if the piston is accelerating into the gas, the wave is intensified. Thus, if the tube is closed at one end with a reciprocating piston, and at the other end with a rigid wall at such distance from the piston that the wave reflects and returns to the piston exactly one cycle later, it will experience a series of such intensifications and eventually break into a shock wave travelling periodically up and down the tube. Since the piston travels into the tube during the high-pressure part of the cycle, it feeds the energy into the gas which is required to maintain the shock. This principle applies to any of the other means of periodically driving the gas herein considered (e.g. by siren induced pressure pulses or magnetically driven periodic discharges), as all these means cause a periodic acceleration of the gas particles each time the compression wave or shock returns, similar to that which would be induced by a reciprocating piston. The principle has the advantage of great power economy.

If these waves are guided along the interface of a liquid and a gas passing through a reaction (guttation) chamber, the violent agitation of the shock-rarefaction sequence causes the liquid to break up into a mist of tiny droplets which immediately permeate the entire gas area of the reaction chamber. This "guttation" effect completely eliminates mechanical equipment from the design of the reaction chamber.

It is a main object of this invention to utilize large-amplitude sound waves as a means of producing physical, chemical and physico-chemical effects.

It is a particular object of the present invention to produce an intense or violent agitation and mixture or combining of fluid materials or substances by the application of large-amplitude sound waves.

It is another particular object of the present invention to apply large-amplitude sound waves to a fluid or fluids to cause efficient intense mixing, emulsifications, or partial or complete inversion of emulsions, homogenization, and the promotion, acceleration and control of chemical reactions and all products resulting from ultra-high temperatures produced in the fluid.

A still further particular object of the present invention is to greatly increase the extent of a liquid-gas interface by the formation of droplets (guttation) through application of large-amplitude sound waves thereto.

Yet another object of the present invention is to form guttation (droplets) at or adjacent to a liquid-gas interface through intense agitation produced thereat or thereon by large-amplitude sound waves.

Still a further object of the present invention is to provide novel, practical, efficient and economical guttation chambers to carry the foregoing objects into effect.

Another object of the present invention resides in the provision of novel, practical, efficient and economical macrosonic (large-amplitude sound) wave generators employable with the aforementioned or other guttation or reaction chambers.

Still a further object of the present invention resides in the application of large-amplitude sound waves at the fibrillation stage of processing of wood pulp for the manufacture of paper; it is believed that the effect of the shock wave will successfully expose already existing surfaces of the water-saturated cellulose by exploding covering layers of cellulose in partial solution, which have coated such surfaces.

The above and other objects and advantages of the invention will appear as the description proceeds, it being understood however, that it is not intended that the invention be limited to the exact details described herein which illustrate some of many possibilities by which the invention may be carried into effect as a result of the knowledge gained through or gleaned from an understanding of the invention. It is further intended that these be included as a part of the invention both in method and means, all such obvious changes and modifications thereof as would occur to a person skilled in the art to which this invention pertains and as would fall within the scope of the claims.

In the drawings:

FIGS. 1 to 4 illustrate in section embodiments of guttation chambers employable in the invention;

FIG. 5 is sectional view of a simple type of guttation chamber;

FIG. 6 is a sketch indicating a conjectured mechanism of guttation process;

FIG. 7 illustrates diagrammatically a modified type of shock amplifier;

FIG. 8 is a cross sectional view of a sinusoidal-track piston employable in the invention;

FIG. 9 is a longitudinal sectional view of FIG. 8 taken through line 9—9;

FIG. 10 is an assembly detail of the bearings engaging the sinusoidal tracks seen in FIG. 9;

FIGS. 11, 11A illustrate diagrammatically periodic shock wave generators, tubes or similar devices employable with guttation chambers according to the invention;

FIGS. 12, 12A illustrate diagrammatically a specific form of shock wave generator;

FIG. 17 is a perspective view of a segment of aeromagnetic generator of large-amplitude waves;

FIG. 18 represents joined segments depicted in FIG. 17 of a linear assembly of aeromagnetic generator of large-amplitude waves;

FIG. 19 represents joined segments depicted in FIG. 18 of a closed loop assembly of aeromagnetic generator of large-amplitude waves;

FIGS. 20 and 21 illustrate transverse magnetic field inducers for use with a terminal segment of the generator depicted in FIG. 18;

FIGS. 22 and 23 are top and side views respectively of a transverse magnetic field inducer for use at an angular bend of a aeromagnetic generator;

FIGS. 24 and 25 are side and top views respectively of portions of the segments of the generators depicted in FIGS. 18 and 19;

FIGS. 26, 27 and 28 are alternate forms of segments of the generators depicted in FIGS. 18 and 19;

FIG. 29 is a schematic view of a two-branch periodic shock wave generator;

FIGS. 30, 31 and 32 are views showing alternative driving mechanisms for use at point A of the generator shown in FIG. 29;

FIGS. 33 and 34 are perspective views of segments of the generators shown in FIGS. 18 and 19 which produce both transverse and longitudinal magnetic fields;

Figure 53:
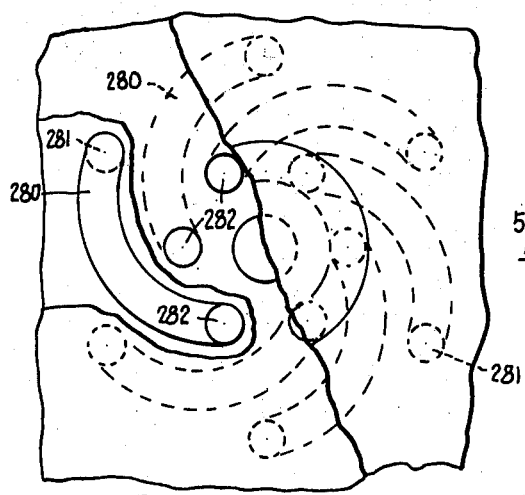
Figure 53A:
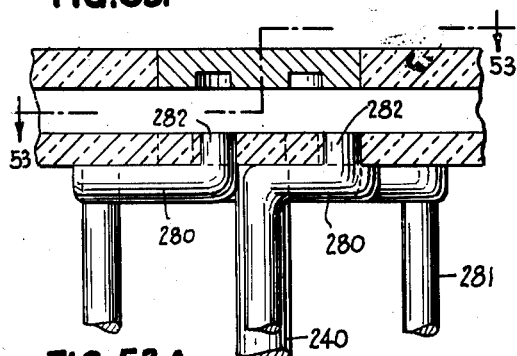
Figures 54, 54A:
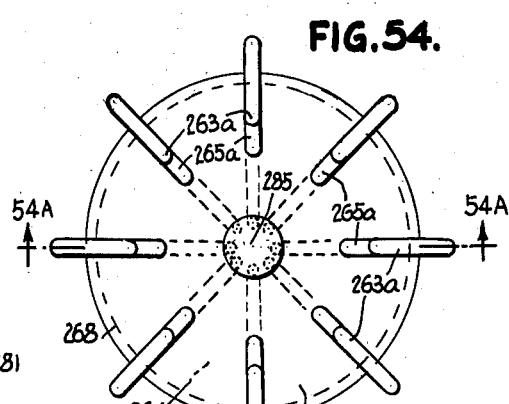
Figure 55:
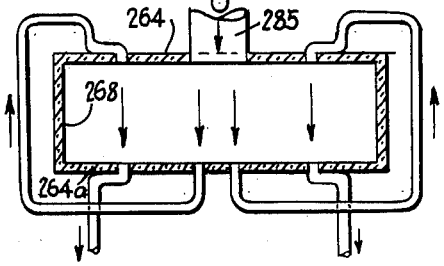
Figure 55A:
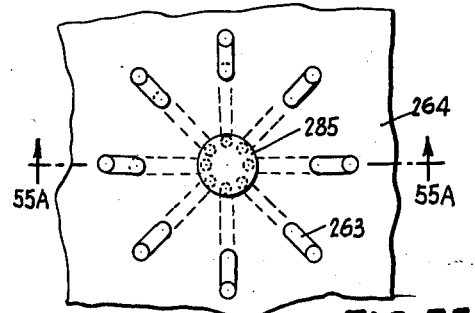

FIG. 35 diagrammatically illustrates an external drive circuit employable with the generator segments shown in FIGS. 17-34, inclusive;

FIGS. 36 and 37 diagrammatically depict shock waves impinging on a region of hot gas;

FIG. 38 diagrammatically illustrates a quasi-spheroidal generator;

FIGS. 39, 40, 40A and 41 are views indicating variations of electrode assemblies for use with the generator shown in FIG. 38;

FIG. 42 is a cross sectional view of a cylindrical aeromagnetic generator;

FIG. 43 is a divergent-convergent periodic shock generator;

FIG. 44 is a sectional view of a liquid-medium periodic shock generator;

FIG. 45 is a diagrammatic view indicating an arrangement of inclined plate electrodes for a driving cell;

FIG. 46 is an electrical diagram indicating the adaptation of a three-phase power to driving circuits for aeromagnetic macrosonic generators;

FIG. 47 is an electrical diagram indicating "transmission line" coupling of driving cells for the intensification of periodic shocks;

FIGS. 48, 49, 50 and 50A are schematic views of various arrangements of series-connected driving cells for mounting on the rim of a cylindrical aeromagnetic macrosonic generator;

FIGS. 51, 51A, 52 and 52A are schematic views of elements of intermediate inward and outward-driving cells, respectively for a cylindrical aeromagnetic macrosonic generator;

FIGS. 53 and 53A show a modification of FIG. 41;

FIGS. 54 and 54A schematically indicate various means for connecting elements of an inward-driving cell in series with axial electrodes;

FIGS. 55 and 55A indicate modified means for connecting elements of an inward-driving cell in series with axial electrodes.

Figure 56:
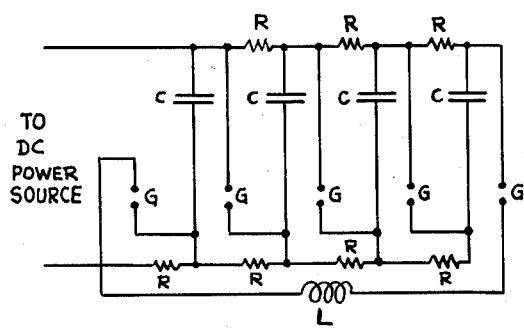

FIG. 56 is an adaptation of a Marx generator where the spark gaps are replaced by the electrodes of driving cells of an aeromagnetic macrosonic generator.

Figure 57:
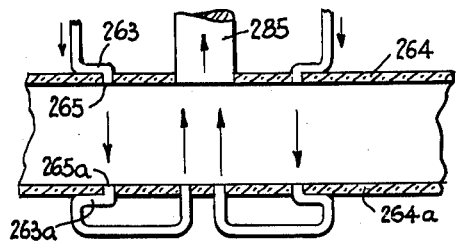

FIG. 57 shows schematically an arrangement for producing periodic shocks in mechanical systems.

Reference now will be made more particularly to the drawings which illustrate some of the many possible examples of carrying out the invention.

GUTTATION CHAMBER

A device employable in this invention is the guttation chamber which generally may be an enclosure whose bottom portion consists of one or more reservoirs containing liquids, the top portion made to accommodate a gas or mixture of gases. Either the gas-filled or liquid-filled portion, or both, are coupled to one or more macrosonic (large-amplitude sound) generators, so that the large-amplitude sound waves, which may or may not contain a succession of shock waves, sweep back and forth through the contents of the enclosure. The enclosure may be fitted with various ducts to allow the introduction, removal, and/or recirculation of various gases and liquids.

Uses of the device include: greatly increasing the extent of a liquid-gas interface by the formation of droplets (guttation), violent agitation, mixing emulsification or partial or complete inversion of emulsions, homogenization, compounding and the promotion, acceleration and control of chemical reactions, and the production of ultrahigh temperatures.

In the case of exothermic chemical reactions, various cooling devices may be incorporated in the construction of the chamber in order to maintain the proper temperature, and conversely, heating devices in the case of endothermic reactions.

Referring to FIG. 1, one end 30 of a tubular gas reservoir 31 is connected to the gas column of a macrosonic generator later described. The other end 32 is closed. Gases may be introduced through duct 33, and liqids 34 through duct 35. The mixture, suspension, emulsion, or chemically reacted products may be removed through a duct 36. The length of the gas reservoir and its mode of coupling to the generator may be varied so as to give different shapes (pressure-time dependence) to the waves in the chamber. The depth of the liquid reservoir 34 may be adjusted so that disturbances in the liquid that are induced by the waves in the gas 31 are reflected from the bottom 37 back to points on the surface 38 with such phases as to produce the maximum effect.

FIG. 2 illustrates a guttation chamber similar to the disclosure of FIG. 1 except that now large-amplitude waves are also induced directly into the (tubular) liquid reservoir 40 through a coupling (not shown) with a liquid macrosonic generator. This coupling may be at either end of the reservoir. The liquid and gas reservoirs 40, 41 respectively may be of different lengths in order to obtain the most advantageous wave patterns. The relative phasing and frequencies of the two generators may be adjusted so as to obtain the maximum pressure and velocity differentials between the liquid and gas.

The bottom of the liquid reservoir 40 is indicated at 37a and the interface or surface of the liquid reservoir 40 is indicated at 38a.

According to FIG. 3, the guttation chamber is the cylindrical region under the disc-shaped stop 50. The entire device is symmetric about a vertical axis through the center of the disc 50. Periodic pressure and rarefaction pulses are communicated to the periphery 51 of the guttation chamber from the gas column 52 of a macrosonic generator 53 through the cylindrical cavity 54 above the stop 50. These periodic pulses induce converging and diverging cylindrical waves in the gas under the stop 50. Gases and liquids may be introduced through ducts 55, 55a, 56, 56a, to chambers 58, 59 respectively, symmetrically placed around the axis and the products removed through a duct 57 at the center. There is provided a wave amplitude control 60.

The waves become increasingly intense at points nearer the center. This is an advantage in certain chemical reactions like the sulfonation of dodecylbenzene with gaseous $SO_3$, where the product increases enormously in viscosity as the reaction nears completion. Thus, as the reactants are flowing toward the center, they will be acted upon by increasingly strong waves as the viscosity of the product increases. The intense periodic compression at the center might be utilized to facilitate the removal of the highly viscous product. The ceiling (stop 50) of the guttation chamber, instead of being flat, may be shaped so that it is higher (or lower) at various distances from the center in order to cause the waves to be weaker or stronger at these distances. This would enable one to match the increasing viscosity with waves of appropriate strength.

The guttation chamber disclosed in FIG. 4 is similar to that shown in FIG. 3, except that the liquid reservoir 61 of the guttation chamber is extended as a liquid system which is the mirror image (in shape, though not in dimensions) of the gaseous system shown in FIG. 3. Thus, as in FIG. 2, non-linear, large-amplitude waves are induced directly into both the liquid and the gas above the liquid by the two macrosonic generators 62, 63. Again, as in FIG. 2, the relative phasing and frequencies of the two generators may be adjusted so as to obtain the maximum pressure and velocity differentials between the liquid and the gas. The radii of the gas and the liquid reservoirs 64, 61 respectively, would in general have to be different in order to obtain the desired wave patterns simultaneously in liquid and gas.

Products could be removed through duct 65 opening near the center of the liquid-gas interface 66 and extending through the stop 67 and for some distance down the tube of the liquid macrosonic generator 63, where it could then emerge through the wall of the tube of the generator without interfering appreciably with the symmetry of the wave motion in the guttation chamber.

The numerals 60, 68 and 69 indicate amplitude controls. The remaining indicia identical with those appearing in FIG. 3, correspond to like parts. The amplitude control may comprise a valve constructed so as to maintain the shape of the non-linear wave while changing the amplitude.

With a relatively small macrosonic generator producing pressure variations of less than one atmosphere and powered by a one-third horsepower motor, the following results were obtained. The guttation chamber (FIG. 5), in which the lower wall of the chamber is provided with a reservoir of liquid 70, while the two side walls (not seen) are constructed of transparent platsic to allow observation of the behavior of the liquid. One end 71 and the ceiling 72 of the chamber were closed, while the other end 73 was connected to the aforementioned generator. There was a complete absence of any moving mechanical parts in the vicinity of any portion of either the gas or the liquid in the guttation chamber.

The result of this arrangement was that the upper (gas-filled) part 74 of the chamber was almost immediately filled with a fine, violently-agitated mist, without appreciable heating.

The efficacy of this method of droplet formation is indicated by the following observations. When a two and one-half cubic inch reservoir was filled with six parts oil and four parts water, the two liquids became completely emulsified in a fraction of a second. Similar results were obtained with mercury and water. Since the high viscosity of sulphonated products often proves troublesome, water and glycerine were tried which at the ambient temperature of 2° C. had a viscosity of 4200 centipoises (which apparently far exceeds the viscosity of the materials at any stage of the process of sulphonation of dodecylbenzene with gaseous $SO_3$), and still obtained a good mixing action. By the same method and device, butter was produced from commercial cream in approximately three minutes.

Presumably, the mechanism of guttation is somewhat like that sketched in FIG. 6. The arrows indicate the directions and relative magnitudes of velocities of gas and liquid at various points. In the gas a thin region (about 1 cm.) of very high pressure moves (left-to-right in the diagram) along the surface of the liquid at approximately the speed of sound in the gas. This high-pressure region is headed by a plant shock front across which pressure and density jump almost instantaneously.

The pressure pulse on the surface initiates a compression wave in the liquid. The pressure differential between the liquid and the low-pressure gas following the pulse results in an upward jet which breaks into spray. As the propagation speed of compression waves in the liquid is much higher than that in the gas, another jet may preceed the pulse.

In addition, the shock accelerates the gas behind it to a high velocity relative to the liquid surface shown in FIG. 6. Very likely this effect also makes a considerable contribution to the formation of droplets. Finally, the powerful waves transversing the gas-droplet mixture cause violent agitations which break the spray into even finer droplets.

Direct visual observation indicates that the gas-droplet mixture rapidly circulates in large vertices throughout the chamber. In the small device shown in FIG. 5, there is a difference in average pressure of eleven cms of water at the two ends of the chamber. These circumstances may well have a bearing on temperature control and the extraction of the reacted product.

It should be remarked in connection with what was said above about continuous operation that it is estimated that, even with the miniature apparatus shown, some 100,000 pounds of oil-water emulsion could be produced in a year.

A successful amplifier for use in connection with conventional single-shock tubes was suggested by Kantrowitz and shown in the Journal of Applied Physics, September 1950 issue, pp. 874 ff. This amplifier may be adapted in many ways for use in connection with periodic shock tubes, an example of such adaptation being shown in FIG. 7.

FIG. 7 shows an end-portion of a cylinder 80 in which operates the shock-wave-producing piston 81, or any other means of producing large-amplitude periodic movement of the gas. Numeral 85 generally indicates a combined amplifier and frequency multiplier which connects with, or extends from, cylinder 80. The extension 85 constitutes generally a conically shaped device 86 having a constricted portion 87 terminating in a closed nipple 88. The contours of the device 85 are so calculated as to cause optimum amplification of the strength of the periodic shocks when the piston oscillates with the resonant frequency of the device.

The plurality and relative lengths and shapes of the constructions of the constricted portions makes the amplifier, as applied to the periodic shock tube, novel.

A novel feature of the invention resides in providing a guttation chamber in which the lower wall of the amplifier or a portion of the periodic shock tube without the amplifier is replaced by or with a reservoir of liquid.

FEATURES OF THE GUTTATION CHAMBER AND ADVANTAGES OF ITS USE

(a) Viscosity and Attenuation

Unlike devices employing ordinary sound or ultrasonics, which, owing to the small amplitude and energy of the waves, are unsuitable for use with highly viscous substances or media in which the motion is rapidly attenuated, the guttation chamber overcomes such problems by the shear brute force of the macrosonic waves involved. Thus, even a one-third-horsepower unit operates satisfactorily with materials having viscosities up to 4200 centipoises. The advantage of using periodic cylindrical shock waves when the viscosity increases as the operation nears completion was pointed out with reference to the guttation chamber disclosed in FIG. 3.

Again the use of sonic and ultrasonic apparatus is restricted for the most part to liquid and solid systems, as the energy of small-amplitude waves is quickly absorbed when they propagate only short distances through a gas. Also, if such waves in a gas impinge on a liquid, they are almost completely reflected and have scarcely any effect on the liquid. On the other hand, macrosonic waves can propagate great distances through tubes and still deliver considerable energy at points remote from the driving mechanism. And, of course, the effect of gaseous macrosonic waves upon encountering a liquid is to convert large quantities of the liquid into a violently agitated spray, the newly discovered guttation effect upon which the guttation chamber is based.

(b) Continuous Operation

As the liquids and gases can be introduced and the processed materials removed continuously without interfering with the action of the macrosonic waves, bulk processing operations can be performed economically with relatively small sized guttation chambers. It is estimated, for instance, that some 100,000 pounds of oil-water emulsion could be manufactured per year with one-third horsepower unit.

(c) Heat Transfer and Temperature Control

In highly exothermic or endothermic reactions where uniformity of temperature is important, the relatively small size of the guttation chamber and the violence of the agitation and circulation of the materials assures an ease of temperature control which would be impossible in large batch processing units. Also, the complete absence of any moving mechanical parts in the neighborhood of the reactants eliminates the danger of localized temperature deviations caused by friction and by differences in heat capacities of such solid parts. This absence of mechanical parts has obvious advantages in the processing of corrosive chemicals as well, and also in operations where contamination of the product is to be minimized. Indeed, the entire gaseous buffer column between the macrosonic generator and the guttation chamber may consist of some inert gas with no appreciable mixing with the reactant gases outside of what would result from ordinary diffusion processes. It was found, for example, that helium behaved in a very satisfactory manner.

(d) Power Economy

When macrosonic systems are operating in resonance, the phenomena are characterized by the presence of periodic shock waves, that is, once each cycle, a wave front sweeps through the fluid, across which large changes in pressure, velocity and density occur almost instantaneously. As most of the energy fed into the system throughout the entire cycle manifests during this minute portion of the cycle, large effects can be obtained with very modest power input.

APPLICATION OF MACROSONICS TO GASEOUS $SO_3$ PRODUCTION OF DODECYLBENZENE DETERGENT ALKYLATE

Periodic sound waves have been produced some ten times as strong as had been obtained theretofore, that is, approximately 50 pounds per square inch in ampltiude at 60 cycles per second.

Applications of certain of the techniques and devices which have evolved from this work to sulfonation with gaseous $SO_3$ give promise of coping successfully, and on a production scale, with many difficulties peculiar to this operation, thus opening a way to the circumvention of problems of waste, spent acid disposal, etc., associated with such processes as oleum sulfonation.

Among numerous other practical applications of macrosonics, applicant has provided a method of greatly increasing the extent of a liquid-gas interface through rapid and uniform guttation (formation of droplets) and violent agitation of the resulting mist. This might well be the solution to what seems to be the central problem connected with sulfonation with the use of and/or liquid $SO_3$, namely: localized overheating and consequent darkening, or even charring of the product.

The obtained techniques have the following advantageous features:

(1) *Refrigeration.*—The small size of the reaction chamber and the uniform guttation and violent agitation of the resulting gas-droplet mixture reduce problems of heat transfer and uniform temperature control to a minimum.

(2) *Absence of mechanical parts.*—Guttation and agitation are both accomplished through an unusual type of wave motion of the liquid dodecylbenzene and gaseous and/or liquid $SO_3$. The guttation chamber is coupled to the gas-filled tube of a macrosonic generator so that moving mechanical parts of the latter are far removed from the scene of the reaction. This eliminates any chance of friction between the liquid and moving solid parts which may be a source of localized overheating. Moreover, the nature of the gas in the generator is immaterial. The inert gas helium has been successfully used and it has been found that practically no mixing of the gases in the reaction chamber with those in the generator occurs, aside, of course, from that resulting from ordinary diffusion processes.

(3) *Continuous bulk processing.*—Liquid dodecylbenzene can be introduced continuously from below, and gaseous $SO_3$ from above, while the product, which is formed almost instantaneously at the extended liquid-gas interface, is continuously removed from the reaction chamber. I have found that such circulation does not alter the character of the phenomena. This feature, of course, is essential to the practical use of small reaction chambers for production purposes. Speedy removal of the product should simplify the problem of disposal of heat generated by the highly exothermic reaction.

(4) Viscosity problems can be overcome by the sheer brute force of the waves generated. Using a miniature reaction chamber and a very small macrosonic generator (driven by a one-third horsepower motor) there have been obtained encouraging results in tests with materials having viscosities even up to 4200 centipoises.

SINUSOIDAL TRACK PISTON-DRIVE FOR PERIODIC SHOCK WAVE GENERATORS

FIGS. 8, 9 and 10 disclose a sinusoidal track piston employable in the invention which may comprise a cylindrical housing 90 in which is operable a rotatable fly wheel 91 having the sinusoidal or like grooves 92 on the surface thereof adapted to be operatively engaged by the anti-friction bearings or projection 93 extending from the hollow piston 94. The fly wheel 91 is provided with a shaft 95 connected to a rotary power means (not shown) which may be an electric motor, turbine, reciprocating steam engine or the like. Rotation of fly wheel 91 translates its motion to the hollow piston 94 by means of engagement of pin or projection 93a in the sinusoidal grooves 92 thereby forcing hollow piston 94 to reciprocate back and forth within housing 90. It is evident that the amplitude of the piston's oscillation is equal to that of the amplitude of the sinusoidal track. To facilitate mounting and installation of the anti-friction projection 93, openings 96 are provided in the cylindrical wall of the hollow piston 94.

The piston 94 is closed on the right side by a vertical disc-shaped wall 97. Rotation of shaft 95 of fly wheel 91 produces translatory motion of hollow piston 94. The cylindrical housing 90 connects with the tube of a macrosonic generator such that reciprocal movement of piston 94 produces large amplitude waves in the generator. As a matter of fact, the contrivance seen in FIG. 9 may constitute an integral part of the macrosonic generator. The piston 94 is provided with the projections or pins 98 which engage longitudinal key ways 99 in sleeve 94a to prevent rotational entrainment of piston 94 during rotation of fly wheel 91. FIG. 10 discloses the construction of the anti-friction projection means which comprise pin 93a having a sleeve 93b between which and the facing 93c of the sinusoidal groove 92 are located the ball or roller bearings 93d. In the conventional piston which is driven with a crankshaft and piston rod, the amplitude, frequency and area of the piston-face are all severely limited. Moreover, vibration, balancing and mechanical stresses give rise to serious difficulties. These problems are eliminated or obviated in the device shown in FIG. 9.

As heretofore described, the driving unit comprises a rotating fly wheel around the surface of which are inscribed a plurality of sinusoidal tracks. Fitted over this fly wheel is the piston which is a hollow cylinder, closed at one end by a disc. Mounted on the inner surface of the cylinder are a plurality of roller bearings or projections which engage the sinusoidal tracks. The piston is fitted into the cylindrical housing and is mounted in such a way that it is incapable of rotation with the fly wheel, but is free to execute translatory oscillations in and out of the cylinder head.

Due to the symmetry of this arrangement, vibration and balancing problems are minimized, while mechanical stress can be spread over an almost indefinably large number of contact points (the roller bearings or projections) between the fly wheel drive and the piston. The shock strength in a periodic shock tube is roughly proportional to the frequency and to the amplitude of piston oscillation. In the device shown in FIG. 9, it is clear that if there are N periods in the sinusoidal track around the periphery of the fly wheel, the frequency will be N times the frequency of rotation of the fly wheel. As a result of the elimination of vibration, balancing and stress problems, the frequency of oscillation can be made much larger than that of the conventional crankshaft drive. Furthermore, it is possible to capitalize on the greater area of the piston-face through devices like the shock amplifier, FIG. 7.

The device (FIG. 9) apparently is ideal for use as a large-amplitude under-water sound generator for novel signaling and detection.

The number of projections engaging any one track must be equal to the number of periods around the periphery and must all be located equidistantly in the same plane perpendicular to the axis of the device.

SIREN-DRIVE PERIODIC SHOCK WAVE GENERATOR

FIGS. 11 and 11a illustrate diagrammatically periodic shock wave generators, employable with the guttation chambers heretofore described. It may essentially comprise the cylindrical chamber 100 provided with a closed end wall 101 and another closed end wall 102 through whilh projects the shaft 103 of a motor or other power driving source 104. The shaft 103 is connected to the closed wall 105 of an inner rotatable cylinder 106 having a single opening or hole 107 communicating with openings 108, 108a, provided in the wall 109 of chamber 100. Sleeves 110, 110a connect the chamber 100 with a high-pressure source 111 and a low-pressure sink 112, respectively, the said high-pressure source 111 and low-pressure sink 112 being connected through conduits 113 and 114 to a turbine 115 or a plurality of series-connected turbines. In FIG. 11a pumps 116, 116a are substituted for the turbine 115. FIG. 11 represents a closed circulatory system, whereas in FIG. 11a the high and low-pressure systems are independent. This may be called a "siren-drive." The advantage of this device is that the gas itself does most of the movement and work, while moving mechanical parts serve only as a guide. This device incorporates a rotary valve comprising the two mentioned cylinders 100 and 107, outer and inner respectively, the outer one forming part of the shock tube, while the inner one, being free to rotate, is driven by the motor 104. The two diametrically opposed openings 108 are bored in the outer cylinder 100, one of which is connected to the high-pressure gas tank 111, and the other to the low-pressure tank 112. As heretofore stated, the rotating inner cylinder 106 has one hole or opening 107, which is aligned with the two holes or openings 108 in the outer cylinder 100. This opening 107 communicates in turn with (1) the high pressure duct or sleeve 110, (2) the closure between the ducts or openings, (3) the low-pressure exhaust duct or sleeve 110a, (4) the other closure between the ducts or openings. If the tubular extension 100a of the cylindrical chamber or housing 100 is tuned to the resonant length, which is equal to half the length of the waves produced by the impulses generated by the siren, this has the following effects on the shock. As the shock front passes position A from left to right, the high-pressure duct 108 opens, letting in a stream of high-pressure gas which increases the pressure and gas velocity behind the shock and so intensifies it. The shock continues down the tube and reflects at (B) the end wall 101 while the opening 107 in the inner hollow cylinder 106 is closed. On its way back, when the shock is at position C, the inner cylinder 106 opens to the low-pressure exhaust duct 108a. As the gas rushes out, both the pressure and the forward velocity of the gas in front of the shock are reduced. It is believed that both these circumstances increase the shock strength still further. The siren closes again just before the shock reaches it, and the latter, finding no egress, reflects on the left end wall 101 and starts its left-to-right journey again. When it reaches position A once more, the process repeats.

Clearly, the gas is doing most of the work, being merely directed by the siren mechanism. This makes for a minimum of frictional losses and vibration troubles due to moving mechanical parts. The main source of power is, of course, the pressure differential between the gases in the tanks 111 and 112 connected to the tube ducts 108 and 108a.

In the device indicated in FIG. 11 the gas in the right-hand tubular extension 100a remains there indefinitely except for a slight amount of mixing with the driver gas through diffusion processes. This is an advantage when one wants to keep the sample uncontaminated by the driver gas or when one desires to replace the end wall 101 with various attachments like, for example, the guttation chamber heretofore described. However, the exhaust duct 108a could just as well be connected to another siren at the right end of the tubular extension 100a, both sirens rotating synchronously. Then the gas would flow into the left end of the cylindrical housing and out of the right end of the tubular extension 100a, being hammered by several shocks during its passage through the cylindrical housing 100 and extension 100a. The high-pressure and low-pressure tanks 111 and 112 connected to their respective ducts 108 and 108a can also be externally connected through a turbine 115 or plurality of series-connected turbines (FIG. 11) so that recirculation can be maintained.

STEADY-FLOW SHOCK WHISTLE FOR GENERATING STATIONARY PERIODIC SHOCKS

FIG. 12 illustrates diagrammatically a specific form of shock-wave generator which may be referred to as a shock whistle. Two gas tanks 120 and 121, high pressure and low pressure, respectively, are connected by an axially symmetric tube 122 which is undulated in longitudinal section as indicated by the numeral 123. Suppose the difference in pressure between tanks 120 and 121 is great enough so that the gas flows through the tube 122 at supersonic speed. Then, a compression wave will issue from segment A of tube 122. If the flow speed and shape of tube 122 are adjusted so that this compression wave strikes the wall at the region B, the compression wave will be further intensified upon reflection. It will be noted that the regions A and B (which are representative of similar regions in tube 122) are concave inwards, and after reflection in several such regions, the wave will break into a conical shock, which in turn will continue to be reflected in succeeding regions as a sequence of conical shocks, as indicated at 124. The compression wave is indicated by the numeral 125. Greater pressure differentials between tanks 120 and 121 and faster flows would produce Mach shocks, that is, truncated conical shocks joined by disk-shaped shock fronts. In either case, the wave pattern remains stationary, each particle of gas experiencing identical changes in pressure, density, velocity, etc., as it reaches various points along the pattern.

The gas which is originally near the axis 126 will remain near the axis, as illustrated by the particle path 127, indicated by a dotted line. Thus, in chemical applications, the reactants could be introduced near the center of the inlet throat 128, through a small duct 129 (FIG. 12A) positioned along the axis of tube 122 and the product of the reaction withdrawn through a similar duct (not shown) at the other end of tube 122. The inert driver gas would then simply form a sheath through whose agency the product of the reaction is pounded into a succession of high and low temperatures and densities.

INTERNAL COMBUSTION PERIODIC SHOCK WAVE (MACROSONIC) GENERATORS

Figure 13:
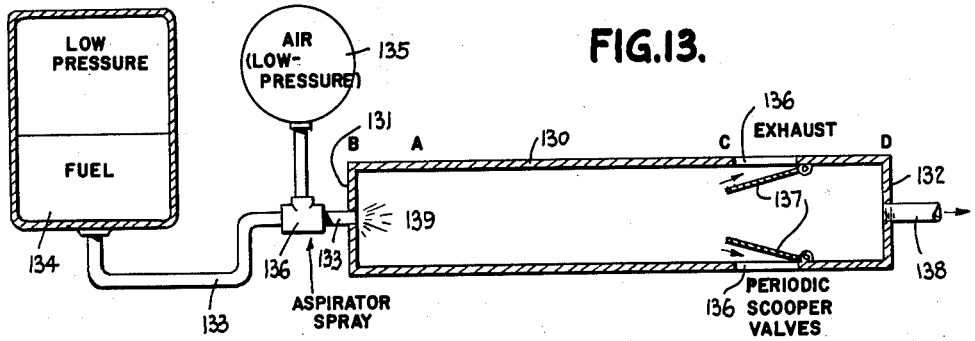
FIG. 13 illustrates an internal combustion type shock generator.

FIG. 13 illustrates an internal combustion type macrosonic generator which comprises a cylinder 130 closed at both ends 131, 132. Connected to the end wall 131 is a conduit 133 leading to a low-pressure fuel tank 134. Interposed between the tank 134 and cylinder 130 and in the line 133 is a low-pressure air reservoir 135 and an aspirator spray 146, adapted to spray atomized air-fuel mixture into the cylinder 130. Cylinder 130 is provided with a plurality of symmetrically disposed openings 136, there being a flap valve 137 for each of the openings 136. The flap valves 136 are arranged to open inwardly of the cylinder. The end wall 132 may be completely closed or may be connected through a communication means 138 to a guttation chamber or other shock device.

This device may be called an internal combustion macrosonic generator. This generator requires no pistons, no fuel pump, and no starting motor. After the generator is started, no ignition system is required. Because of the high temperature and high compression in the combustion chamber 139, economical fuels, it is believed, would burn more efficiently than gasoline does in a conventional internal combustion engine. The operation of the generator during a few cycles after starting and after a steady state has been attained will now be described. (The generator may be started by suitably injecting and igniting air-fuel mixture at 133 by any suitable means.)

Figure 14:
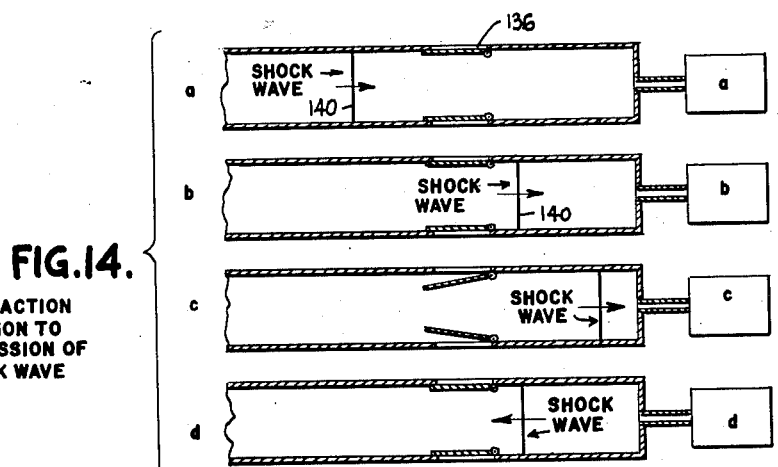
FIG. 14 illustrates the action of the valves seen in FIG. 13 in relation to the progression of the shock wave.
Figure 15:
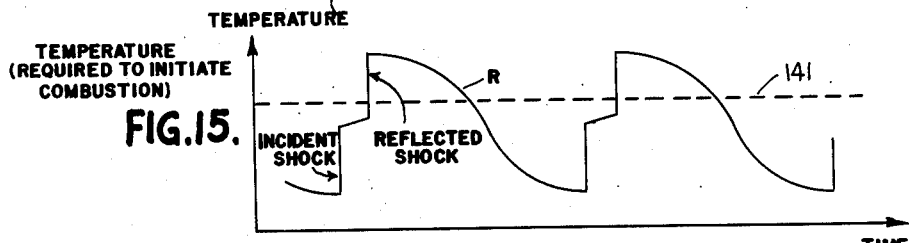
FIG. 15 is a graph indicating temperature vs. time at the point A of FIG. 13.
Figure 16:
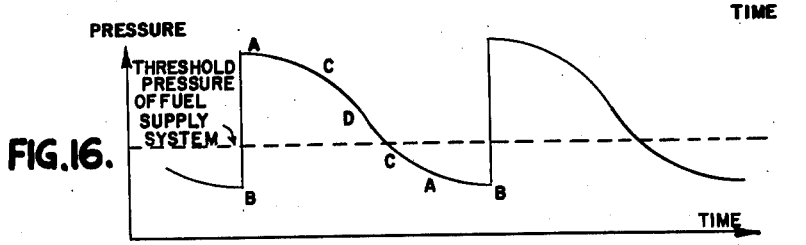
FIG. 16 is a graph indicating pressure vs. time at left end wall B of FIG. 13.

The shock is nearing position A, moving from right to left. Although this region is filled with an atomized fuel-air mixture, the temperature will not yet be raised sufficiently to cause combustion. However, when the shock is reflected at the left end wall B and starts on its transit from left to right, it leaves in its wake a mixture with a temperature elevated so far above the previous temperature that burning occurs continually just behind the shock front, raising the pressure and increasing the shock strength. The sequence of temperatures in this region is indicated in FIG. 15. FIG. 14 shows the valve action in relation to the progression of the shock wave having a shock front 140. The shock continues down the tube past position C (the valves being closed at this phase of the cycle as indicated in (a) and (b) of FIG. 14. It leaves in its wake gas streaming to the right. At the appropriate time (that is, the time such that the rarefaction wave caused by the opening of the valves will reach the shock just after its reflection from the end wall 132 (D)), the valves at C open and scoop the moving gas out of the exhaust ports 136. The valves 137 may be referred to as periodic scooper valves. The vanes or flaps 137 in the valves divert part of the left-to-right momentum of the streaming gas which would ordinarily oppose the right-to-left motion of the shock front and the gas in back of it. This diversion of momentum results in a thrust on the vanes or flaps 137 of the valves, and hence on the generator as a whole. This thrust might make the generator useful as a propulsion device, although there are other possible applications. The valves 136, 137 also perform the important function of getting rid of excess gas resulting from the burning of the fuel-air mixture. In FIG. 15, the graph shows temperature as a function of time at position A (FIG. 13) near the left end wall. The dotted line 141 indicates the temperature required to initiate combustion and the graph shows the condition at point A throughout the cycle, the incident shock, the reflected shock, the time interval between incident and reflected shocks, and the rarefaction R following the reflected shock. When the shock front reaches C on its right-to-left journey, the high-pressure and streaming of the gas behind it knock the flaps 137 shut, as seen in (d) of FIG. 14. As the shock approaches the left end wall 131 (B) of the tube or cylinder 130, the said left end wall 131 is experiencing the low-pressure phase of the cycle. This is seen in FIG. 16, which is a graph showing the relation between pressure and time (pressure cycle at left end wall B). In this graph the letters A and C above the curve indicate positions of the shock front during left-to-right transit and the then prevailing pressures, and the letters D, C, A, B below the curve indicate positions of the shock front during the right-to-left transit and the then prevailing pressures. During the phase when the shock approaches the left end of the tube or cylinder 130 and the left end wall B is experiencing the low-pressure phase of the cycle, the pressure drops below that behind the fuel-air supply, which is then mixed and automatically sprayed into the cylinder 130. When the shock front reaches position A, the entire cycle repeats. It is quite apparent from the foregoing explanation in conjunction with the graph in FIG. 15 that only a single starting spark is required.

The valves 136, 137 may be designed to operate automatically, for example, by being loaded and fitted with resilient means such that the natural frequency of oscillation of their moving parts are the same as the resonant frequency of the generator. Then, the motion of the gas itself will favor the proper phasing of the valves.

DIVERGENT-CONVERGENT PERIODIC SHOCK TUBE

A modified form of macrosonic periodic shock wave generator is shown in FIG. 43, which comprises a gas-filled tube 292 closed at one end 290, the other end being closed by the head 291 of an oscillating piston 292 or other periodically pulsating device. The body 293 of the tube has the arcuate wall section 294 which diminishes in diameter at its ends as clearly seen in the figure. At resonance, the forced periodic movements of the gas at the left end 292a generate a periodic shock, which due to the curvature of the walls 293 assumes an arcuate shock front section 295.

The generator in FIG. 43 may comprise two cones fitted together with the sharp junctures rounded off. In periodic shock tubes wall friction is one of the principal dissipative mechanisms which limit the strength of the shock. Much of this can be eliminated by the construction shown in FIG. 43. The effect produced is that the shock, upon leaving the piston head 291 (or other drive mechanism) would be converted to a diverging spherical shockwave. Because of spherical spreading, the shock would be weakened and the gas motion at the central (widest) part of the tube would be small compared to that in a cylindrical tube, where the amplitude of the motion, particularly near the center, is quite large. The shock would be reconcentrated as a converging spherical shock, however, in the convergent section, so that, at the end wall 290 it would actually be stronger than the shock in an equivalent cylindrical tube. Upon reflection of the shock from the end wall 290, a similar process would occur. This device may be considered a "divergent-convergent" periodic shock tube.

APPLICATION OF PERIODIC SHOCK WAVE GENERATORS TO FOOD PRESERVATION

It is doubtful if many micro-organisms could survive the sudden increase in pressure and temperature occurring in even a weak shock wave. Moreover, the extreme rapidity with which such phenomena occur in a shock would probably have a less deleterious effect on the chemical composition, taste, etc., of foodstuffs than pasteurization or other methods for eliminating bacteria or microorganisms, the prolonged cooking customary in conventional canning processes, or even freezing.

For instance, as a substitute for pasteurization, milk might be pumped through a container 295 (FIG. 44). A piston 296 operable at the end 297 pounded periodically with a trip hammer 298 would produce satisfactory shocks. A more efficient device would be driven at resonance by a high-frequency piston, for example, the previously described sinusoidal track piston.

AEROMAGNETIC, PERIODIC SHOCK (MACROSONIC) GENERATORS

FIG. 17 illustrates schematically a segment of an aeromagnetic macrosonic generator. The term "aeromagnetics" is defined by applicant as the science concerned with the motion of a fluid which is both electrically conducting and compressible in the presence of magnetic and electric fields. It thus combines the fields of gas dynamics and electromagnetics. The term distinguishes this field from the development usually referred to as "magnetohydrodynamics" or "hydromagnetics," where compressibility effects have so far been left out of account to a large extent. Such effects play a central role in the operation of the devices herein under consideration.

According to the schematic showing in FIG. 17, there is provided a preferably rectangular tube 150 whose top and bottom sides or walls 151, 152 are made of suitable conducting material functioning as electrodes, and lateral sides and walls 153 and 154 made of non-conductive, electrically insulating materials. The conductors or walls 151, 152 are electrically charged by any suitable means, creating an electrical field within the tube 150. A magnet means (not shown) is applied to the tube 150 to produce a magnetic field or fields therearound and therein. These fields are respectively indicated in the drawing by legends and arrows. Within tube 150 is contained a gas. Operation of the aeromagnetic macrosonic generator of which the device shown in FIG. 17 is a segment may be initialed by one large electric discharge between the conductors 151, 152, or by a succession of appropriately timed smaller discharges. In the latter case a compression wave would be generated and periodically reinforced, which, after a few cycles would break into a shock.

A sufficiently strong shock ionizes the gas in its wake so as to make it a good conductor of electricity. The top and bottom sides 151, 152, which are conductors are charged to a potential somewhat below that required to produce a discharge under ordinary conditions. FIG. 17 indicates a magnetic field which is at right angles to the electric field caused by the charge conducting elements 151, 152. The configuration shown in this figure involves the electric and the transverse magnetic fields for a shock moving to the right of the figure. For a shock moving in the opposite direction (right-to-left) either the electric or magnetic field would have to be reversed.

Now, if a strong shock sweeps through the tube 150, a heavy current will flow through the ionized gas in its wake. The magnetic field at right angles to the direction of this current causes a Lorentz force on the ions and electrons in it, directed down the tube (similar in principle to that by which a common electric motor operates). This forces add to the acceleration the gas particles have already received from the shock. The strength of the shock is augmented by this force and the following circumstance. The flow of the current in the gas will increase its temperature and hence its pressure. Both these phenomena occur automatically just behind the shock front and "feed" it, while nothing unusual happens in front that would tend to weaken it. The current flowing through the gas could be used to induce the external magnetic field.

It is apparent that periodic shocks can be maintained and/or strengthened by employing various types of electric and magnetic fields operating on electrons and ionized (charged) gas particles in an electric discharge. It is further apparent that construction of macrosonic generators with no moving mechanical parts can be based solely on the use of such fields, or the fields can be used in conjunction with other methods of driving the medium (pistons, sirens, etc.). Combinations of four types of field can be used in this connection:

(1) *An electric field*—directed transverse to the motion of a shock, causing a motion of the ions and electrons in this and the opposite directions respectively (electric discharge). This also enhances the shock by raising temperature and pressure.

(2) *A transverse magnetic field*—perpendicular or substantially perpendicular to both the electric field and the direction of motion of the shock. This exerts a Lorentz force on the ions, causing further acceleration in the direction of the shock's motion.

(3) *A longitudinal magnetic field*—in the direction of the motion of the shock. If the intensity of this field increases with distance from the axis of the gas column a constriction will occur in the moving ions behind the shock front (pinch effect). This results in a further increase in pressure and temperature, a decrease in wall friction and a decrease in heat transfer to the walls of the tube.

(4) *An ultra-high frequency field, X-rays, ultraviolet light or heat* may be employed to cause ionization in case the ionization resulting from the shock and the electric field is insufficient.

Two of the many possible general types of geometry for periodic shock tubes are the following. The open ends of segmental tubes shown in FIG. 17 may be joined together in a linear array forming a continuous tube closed at both ends (diagrammatically shown by the numeral 155 in FIG. 18) with the shock sweeping back and forth and reflecting at the two end walls. This arrangement requires one of the fields to alternate in conformity with the right or left transit of the shock. This arrangement may comprise a straight periodic shock tube, one of whose end walls may be removed to permit connection to a guttation chamber or other shock operated device.

The physical dimensions of various segments of the tube may vary. For instance, a sequence of segments with successively diminishing cross-sectional area, joined with smoothly convergent couplings, could be used to concentrate and strengthen the shock.

Unidirectional fields may be used with a closed-loop array, as schematically shown in FIG. 19 and generally indicated by the numeral 156. In such an arrangement each segment 157 may be constructed and function similarly to the segment 150 shown in FIG. 17. The shock would travel indefinitely around the loop without reflection.

The electric field is produced by a potential difference between two electrodes 151 and 152 (FIGS. 17, 20 and 21) facing each other on opposite sides of the tube. Reference will be made to a pair of electrodes which present extended flat surfaces to each other as "plate electrodes." Projecting surfaces of the conductors which span only a limited portion of the length of a segment 150 or 157 of the tube 155 or 156 will be referred to as "point electrodes" as illustrated by the reference numerals 184, 186 of FIG. 26 and 208a, 210a, 211, 211a, 212 and 212a of FIG. 32. In the following designs where plate electrodes are shown, such projecting surfaces may be added on the extremities of the plate electrodes toward which the shock moves. When the leads to a pair of electrodes are shaped in such manner that the current in them contributes to the transverse magnetic field, the combination will be referred to as a "driving cell."

TRANSVERSE MAGNETIC FIELD INDUCERS OR DRIVING CELL FOR AEROMAGNETIC PERIODIC SHOCK WAVE GENERATORS

FIGS. 20 and 21 illustrate magnetic field inducers or driving cells generally indicated by the numerals 160, 161, for use with a terminal segment of the generator depicted in FIG. 18. These devices illustrate means for supplying current to feed the electrical discharge and at the same time produce the transverse magnetic field at the end walls of each of the end segments in FIG. 18. Let it be assumed that the segment depicted in FIG. 17 is the left end segment 150a of the linear array seen in FIG. 18. Then electrically connected to the top electrode 151 is a bent lead 162 which resembles an inverted J in section. Connected to the electrode 152 is a lead 163. The direction of the current is indicated by the arrow in the figure. If a source of high-voltage electric power is connected across the leads 162, 163, the current will flow from 162 to electrode 151, discharge across the gap or space between electrodes 151, 152, and flow out through lead 163. In the region of discharge the current in lead 162 will generate a magnetic field directed into the paper at right angles to the direction of electric discharge.

The device shown in FIG. 21 comprises the electrically conducting member 161 which has the general configuration of the portion 162 seen in FIG. 20 and in addition has the bifurcations 163, 164 which bend upwardly along the sides of the electrodes as indicated by the numerals 165, 166. The effect of currents flowing down through the bifurcations 165, 166 is further to increase the strength of the transverse magnetic field in the region of electrical discharge as well as the overall inductance of the driving cell. It is understood that the bifurcations 165, 166 could continue to bend to form loops, helices or spirals lying against the walls 153, 154 of the segment (FIG. 17) for further enhancement of these effects.

Where a segment of the aeromagnetic generator comprises two angular disposed tubular legs 165, 166, a magnetic field inducer shown in FIGS. 22 and 23 may be employed. This comprises an electric lead 167c forming part of a cap 167 which fits against the flat 168 of the elbow forming the juncture of legs 165, 166. The electrode portion 167a projects within the tubular segment at the juncture of the sides or walls 151a, 151b. Connected to the lead 169 and extending with the tubular segment at the said juncture but opposite the cap electrode 167a is the other electrode 167b.

In FIGS. 24 and 25, one of the electrodes 170 connects with the lead 170a disposed over the side 171a of the aeromagnetic generator segment 171. The lead 170a passes through the aeromagnetic generator segment 171 and projects therefrom. The other electrode 172 connects with the lead 172a which projects from segment 171. The arrows indicate the direction of the current. In the region 173 of the electric discharge the current in lead 170a produces a magnetic field directed into the paper.

FIG. 26 discloses a further embodiment of application of a magnetic field inducer applicable as an intermediate driving cell for an aeromagnetic macrosonic generator for producing periodic shock waves. The number 180 indicates a segment of the aeromagnetic macrosonic generator. Applied thereto is a generally U-shaped electric lead 181 having a perforation through which projects the generator tube 180. From the leg 182 inwardly projects the electrode 184 which in turn projects inwardly of tube 180. Through an opening in leg 183, projects the lead 185 of the other electrode 186, said opening being encompassed by the insulation 187. Leg 183 connects with a lead 188 which in turn connects with a power source or driving circuit, the lead 185 being connected to the other side of the power source or driving circuit. Upon the circuit being energized an electrical discharge will occur in the tube 180 between the electrodes 184 and 186, which will be driven to the right by the field produced by the current in the U-shaped lead 181.

In FIG. 27 the numerals 190, 191 represent the plate electrodes which may form the top and bottom of a segment of rectangular cross-section of an aeromagnetic macrosonic generator. Connected to the ends of electrode 190 and the legs 192, 193 of an electrical lead yoke, which legs may terminate in a single lead 194 connected to one terminal of a power source or driving circuit. The other lead 195 connecting to the driving circuit is connected to the electrode 191. The electrical discharge occurs between the plates 190, 191 and thereby through a gas which may be located therebetween and within the confines of a segment of an aeromagnetic macrosonic generator.

FIG. 28 is a further modified device for producing a magnetic field in an aeromagnetic macrosonic generator for periodic shock waves. In this form the electrodes 200, 201 may be applied to the sides of a segment of the aeromagnetic generator or may form the walls thereof. The leads 202, 203 connecting the electrode 200 are substantially U-shaped and project above electrode 200 for connection to a power source or driving circuit. The other electrode 201 connects with a lead 204 which connects with the other side of the driving circuit.

One or more of the electrodes of the various driving cells described above, instead of being parallel to each other, may be inclined as shown in FIG. 45. Then the bulk of the current will flow immediately behind the shock front where the distance between electrodes through the region of ionization is smallest.

To ensure that the electric discharge occurs uniformly behind the entire shock front, one (or both) the electrodes of the driving cells described above and hereafter may be laminated, the laminations being insulated from each other and parallel to the axis of the tube, and the separate leads to the laminations being connected to independent condenser banks. If only one electrode is laminated, the condenser banks may have a common connection to the other electrode.

The transverse magnetic field may also be maintained by placing permanent magnets or loops, coils, or electromagnets powered by a source independent of that supplying the electrodes along the walls of the tube.

It is sometimes desirable to use a periodic shock tube with two or more branches as shown schematically in FIG. 29. A periodic driving mechanism at A generates shocks travelling in opposite directions. These continue down the two branches C and D, colliding and interacting at the juncture B, and return again to A in time to be reenforced by the next pulse. A plurality of multiple spark or arc arrangements for the driving mechanism at A may be provided.

In FIG. 30, F and G are two oppositely charged electrodes and H is a neutral floating electrode. The arrows indicate directions of current flow in the electrodes and in the electric discharges occurring between F and H and between G and H. The two discharges repel each other as the directions of current flow in them are opposite (reverse of the pinch effect). In other words, the current flow in each discharge gives rise to a magnetic field which causes an outwardly directed Lorentz force on the other discharge, without the need of external coils or loops.

With additional floating electrodes, a plurality of spark discharges may be obtained, each of which repels its two nearest neighbors. This is shown schematically in FIG. 31, where I, J, K and L represent the floating electrodes and M and N represent the two oppositely charged electrodes, which are connected to the power source (not shown).

An arrangement employing a low-voltage, heavy-current arc discharge is schematically shown in FIG. 32. A segment of an aeromagnetic macrosonic generator is indicated by the numeral 206. The electrodes 207, 208 are connected to a driving circuit. There are provided the floating electrodes 209, 210, each of which has a discharge point 211, 211a, and 212, 212a, complementary to a corresponding discharge point. The floating electrode 210 is connected to a high-voltage tickler 213 which may be employed to trigger the arc in synchronism with the shocks. After starting the discharge operation through tickler 213 a spark is produced between electrodes 208a and 210a which ionizes the gas in the segment 206. Then the arc discharges through the ionized gas between the gaps of electrodes 210a and 208a; 212 and 212a; and 211 and 211a.

The devices shown in FIGS. 30, 31 and 32 may each constitute the driving mechanism schematically shown at A in FIG. 29.

It is to be noted that in the driving cells shown in FIGS. 17, 20, 21, 24, 25, 26, 27 and 28, the direction of the current is immaterial so far as the Lorentz force on the plasma or ionized gas is concerned. If the current is in the direction indicated by the arrows, the current in the plasma goes downward and the magnetic field in the neighborhood of the discharge is directed into the paper so that the Lorentz force is to the right. If the current is in the opposite direction, the current in the plasma goes upward and the field is directed out of the paper, so that the Lorentz force is still to the right. For shocks moving from right to left, mirror images of the geometries of the foregoing named figures must be employed.

In the linear array type of periodic shock tube (FIG. 18), where the shock wave sweeps intermittently to the right and to the left, a sequence alternately of driving cells of the first type then the other, could be placed along the tube, each firing once per cycle as the shock passes in the direction appropriate to the cell. Or the tube could be more densely packed with driving cells of both types, namely those having the geometries shown in the figures and those that are the mirror images thereof, the direction of electric discharge of each type making a 90° angle with that of the other.

FIGS. 33 and 34 are driving cells whose leads are in the form of modified loops or coils for the purpose of producing longitudinal as well as transverse components of magnetic fields. The purpose of the longitudinal fields will be described herein below. In FIG. 33 the electrodes are indicated by numerals 220 and 221 and the loops or coils which connect with electrode 220 by the numeral 222. The electrode 221 is connected to a lead 223 which connects with one side of a power source or driving circuit, the other side of the latter being connected to the loop 222.

In FIG. 34 the electrodes are represented by the numerals 225 and 226. The loop 227 connects with the electrode 225 and the loop 228 connects with the electrode 226.

The longitudinal field may also be maintained by a helical winding of conducting material about the tube or a sequence of loops or coils encircling the tube. Such devices may be connected in series with the electrodes or supplied with current from independent power sources.

In all cases where the transverse or longitudinal magnetic field does not have sufficient time to build up before the shock has passed out of range, the loop or coil producing the field can be placed an appropriate distance down the tube from the electrode to which it is connected so that the field has maximum intensity when the plasma or ionized gas reaches it.

EXTERNAL SWITCHING

Once the various types of aeromagnetic macrosonic generators described herein are operating in resonance, the ionization behind the shock front should be sufficient to trigger the firing of the appropriate driving circuit. However, during the first few cycles of operation, before the attainment of operating temperatures which bring the wave speeds up to the values for which the generators were designed, and in cases like the cylindrical generators, to be described, and in all other cases where a great many driving circuits must be synchronized, some system of external switching, for instance, mechanically operated spark gaps, may be required for added stability.

If a wall of the tube were made of a material transparent to an ionization producing form of radiant energy, beams of such energy could be employed to ensure good ionization and electrical conductivity behind the shock front. For instance, a beam of ultraviolet light moving synchronously with the shock might be used in conjunction with a quartz wall of the tube.

DRIVING CIRCUITS AND "TRANSMISSION LINE" COUPLINGS FOR AEROMAGNETIC PERIODIC SHOCK GENERATORS

FIG. 35 is a schematic view of a driving circuit. Consider a condenser bank with large capacitance C connected and in shunt with one of the driving cells described in connection with FIGURES 17 to 28 inclusive, the driving cell having a small inductance L and a resistance R which is effectively infinite except during the passage of the plasma or ionized gas behind the shock, when the resistance drops to a small value of R. This arrangement is fed with a high voltage transformer having a large effective inductance L'. Suppose that it is arranged that the plasma passes the driving cell near the time when the condenser is fully charged in one direction. Owing to the small value L of the inductance of the circuit mesh containing the driving cell, the condenser will rapidly discharge, causing a heavy current to flow across the electrodes through the low-resistance plasma so that the condenser begins to charge in the reverse direction. Then the plasma completely passes out of the segment containing the driving cell, so that this mesh is open-circuited, while the transformer continues to build up the reverse charge of the condenser. If the resonant frequency of the tube is so chosen that the shock and plasma again pass the driving cell in the same direction near the time the maximum reverse charge is built up, a similar current pulse will flow in the reverse direction. So far as the effect on the plasma is concerned, it is immaterial which way the current flows. For 60 cycle power supplies, this arrangement will require the resonant frequency of the shock tube to be 120 cycles, or sub-multiples thereof (60, 40, 30, c.p.s., etc.).

Polyphase power may be employed in driving circuits for aeromagnetic macrosonic generators as indicated in FIG. 46, where the primaries P, P1 and P2 of three high-voltage power transformers are connected to a three-phase power line T. The remaining portions of the circuits are like that shown in FIG. 35. The action of the three driving cells will then be 120° out of phase with one another and, if placed at appropriate points along the tube, will synchronize with the motion of the shock. The single driving cells in FIG. 46 may be replaced by sets of transmission line-coupled driving cells hereinafter about to be described.

Successive driving cells (with or without the loops or coils for producing the longitudinal field) may be coupled electrically as indicated schematically in FIG. 47. As the shock, plus ionized gas, proceeds from one cell to the next, the discharge gaps in meshes $(a)$, $(b)$, $(c)$, $(d)$ are short-circuited in turn, while all other meshes are open-circuited. Thus condenser $C_A$ first discharges through mesh $(a)$, charging condenser $C_a$. Mesh $(a)$ is then open-circuited, while mesh $(b)$ is closed. Condenser $C_a$ then discharges through mesh $(b)$, charging condenser $C_b$, etc. The capacitance of the individual driving cells may be augmented by connecting additional condensers in shunt and their reactances may be increased by connecting additional reactance in series with their coils, loops, etc., in order to coordinate the action of the various meshes with the motion of the shock.

Additional energy may be put into the system by installing another transmission line at a point B further down the tube whose driving circuit is so phased that the condenser $C_B$ is fully charged when the shock arrives. Additional transmission lines and driving circuits may be installed at points further down the line. As mentioned above, polyphase power provides a convenient means of phasing the various driving circuits. The driving cells may also be dispersed along the tube with intervening cells driven by independent systems like the above.

FIG. 56 shows schematically a driving circuit suitable for use with a direct current, or rectified A.C. power source, which is not dependent on the frequency of alternation of current like those described in connection with FIGS. 35 and 46. A plurality of series-connected driving cells (all so situated in the generator as to fire simultaneously) is represented by the gaps G with inductances of their magnetic field producing leads lumped together in the inductance L. Between firings, when the gaps G are open circuited, the condensers C charge through the resistors R. When the shock and ionized gas reach the electrodes of the plurality of driving cells (represented by the gaps G), their resistances are so lowered in comparison with the resistances R that the condensers all discharge simultaneously through the gaps G and lumped inductance L. Values of the resistors R and condensers C may be adjusted so that the condensers require one period of the aeromagnetic generator to attain full charge. This type of driving circuit would be advantageous whenever simultaneous firing of several driving cells is a problem.

QUASI-SPHEROIDAL AEROMAGNETIC PERIODIC SHOCK WAVE GENERATORS

There will now be described the effect of bombardment of hot zones by shock waves and various means of producing ultra-high temperatures. A decisive advantage of periodic shock methods over other ways of producing ultra-high temperatures is that the bulk of the energy need be stored cumulatively only in the high-temperature zone, relatively small amounts being delivered with each cycle from comparatively modest power sources. Indeed, in a perfectly insulated periodic shock tube, the temperature would rise exponentially.

This feature can be combined with another phenomenon which would result in exceedingly high temperatures with the action of even a single shock. Suppose a region of high-temperature gas is created in a shock tube, say by an electric discharge through the gas. If a shock wave impinges on this region, FIG. 36 depicts the subsequent sequence of events. In FIGS. 36 and 37, full lines indicate shock fronts, the dot-dash lines the boundaries between hot and cold zones, and the even-dashed lines indicate particle paths. A shock (coming from the left in the diagram) is transmitted into the hot gas, while a rarefaction wave is reflected back into the cold gas. When the shock reaches the other boundary of the hot zone, one shock is reflected back into the hot gas and another is transmitted into the cold gas on the other side. When this reflected shock returns to the left boundary of the hot zone, it is reflected again. This process is repeated many times, successive reflected shocks yielding some of their strength to the shocks which are radiated into the cold gas on each side. Each time a shock traverses the hot gas, the temperature is appreciably increased. In effect, then, the shock becomes partially trapped by the hot gas.

In this connection, it should be mentioned that applicant tried bombarding a low-temperature brush discharge with periodic shock waves in air. What appeared to happen was that this discharge was periodically converted into a high-temperature spark discharge. As compounds of nitrogen and oxygen were detected, it appears that a nitrogen-fixing chemical reaction proceeded forward during the high-temperature phase of the cycle and was quenched by the abrupt drop in temperature before appreciable reverse reaction could take place.

If the hot zone is simultaneously bombarded on both sides by shocks of equal strength, the wave pattern is as shown in FIG. 37. The center of the hot zone where the shocks collide and interact remains at rest. This is exactly as if half the hot gas were restrained by a rigid wall at the center, against which the shocks are reflected. However, an actual wall would give rise to containment problems and heat transfer losses. Thanks to the interaction of the transmitted shock with the shock coming from the other side, the first reflected shock, and hence succeeding shocks in the hot zone are much stronger than in the previous case, with the result that temperatures and pressures become even more highly elevated.

In the case of a spherical (or cylindrical) shock converging on a spherical (or cylindrical) hot zone, the pattern is similar, but with the effects at the center again increased many fold. Moreover, in the spherical case there is no heat transfer to the walls of the tube, as before.

Now, the occurrence of a reflected rarefaction wave when the shock strikes the hot zone is reminiscent of what happens when a shock or a compression wave reaches the open end of a tube. Experience has shown that tubes which are open at one end and closed at the other end with an oscillating piston can be made to resonate at half the frequency of a closed periodic shock tube of the same length. Thus, a double or multiple branched tube like that shown in FIG. 29 with a hot zone at the intersection B could probably be made to resonate. However, in the open-ended piston-driven tube, no shocks occur even at resonance. Two ways out of this difficulty suggest themselves. It is perhaps desirable to kill the reflected rarefaction waves when they return to the other end A of the branches with additional pulses, in effect, doubling the frequency. Another way is to choose the length of the branches so that shocks from A reach the hot zone at times when they will collide with shocks reflected from the center (FIG. 37). This entails a resonance condition both in the hot zone and in the external periodic shock tube assembly. Applicant has determined that shocks colliding at a boundary between hot and cold gases can both be reflected as shocks without the occurrence of the rarefaction waves seen in FIGS. 36 and 37. Thus, if shocks in the cold gas are timed to collide with shocks in the hot zone, the reflections will be similar to those at end walls, so that the devices considered will certainly resonant like closed periodic shock tubes.

It is preferable to eliminate the longitudinal walls of the branches of the periodic shock tube assembly, which only cause friction and heat losses and to take advantage of the more intense effects of spherical shock waves. To this end, everything is enclosed in a prolate quasi-spheroidal shell 230 (FIG. 38) with a periodic spark drive at one focus A and a continuous electrical discharge producing a hot zone at the other focus B. The shell should be so shaped that impulses travelling in all directions from A will be reflected at the shell and all converge at the same time at B. If a plurality of pairs of converging electrodes are employed at A in the manner shown in FIG. 39 oppositely directed currents indicated by the arrows in the electric discharges repel one another in the same way as in the devices depicted in FIGS. 30–32. In analogy to the electrodes shown in FIGS. 20 and 30, axially symmetric electrodes could be constructed as shown in FIGS. 40, 40A and 41, by terminating an axial lead 240 with a disc-shaped cap 241 and surrounding it with a plurality of electrodes 242 of the opposite polarity, spaced from the rim of the cap 241 so as to form a plurality of spark gaps. Each of the outside electrodes 242 are connected to one side of independent condenser banks, and the central electrode 240 is connected to the other side of the condenser banks. The discharge would then be blown out on all sides by the action of the field produced by the current in the axial lead 240. The axial lead 240 could also terminate short of a protruding electrode 243 (FIG. 41) at the center of the cap 241, forming a gap at the axis across which a discharge flows in a direction opposite to that of the surrounding discharges. The effect of the field produced by the axial discharge would be similar.

Alternatively, hot zones could be maintained symmetrically by continuous discharges at both points A and B of FIG. 38, and such discharges might be pulsed with additional power input in synchronism with the motion of the shock.

A summary of the advantages of the foregoing arrangement follows:

The hottest point at the center of the hot zone B is far removed from surfaces that would entail heat losses and problems of containment.

Additional energy can be fed into the zone B with each cycle, allowing the attainment of ultra-high temperatures with more modest power installations.

Advantage is taken of the excessively high temperatures and pressures peculiar to converging spherical shocks.

The shocks are partially trapped by the hot zone, being multiple reflected from its edge.

Such reflections are further intensified by interaction with transmitted shocks emanating from A.

The velocity of the gas is small near the quasi-spheroidal shell so that the wall friction is minimized.

Shocks near the shell are weak or non-existent owing to spherical expansion, so that another source of dissipation is minimized.

CYLINDRICAL AEROMAGNETIC MACROSONIC GENERATORS

FIG. 42 is developed by rotating the device of FIG. 20 about a vertical axis. This general form of cylindrical aeromagnetic macrosonic generator produces exceedingly intense cylindrical shock waves at the center. In this figure an intermediate inward driving cell comprising the members 260, 260a, between the axis 261 and the rim 262 is shown in the form of annuli 263, 263a which abut against the walls 264, 264a of the cylinder. The members 260, 260a from the annuli 263, 263a terminate in annular or ring-shaped electrodes 265, 265a. Passing through the axis 261 are the axial electrodes 266, 266a. Extending from the wall 264a is the cylindrical electrode 267, located adjacent to the rim wall 268, the electrode being connected to the cylindrical lead 267a. Abutting against the rim wall 268 is a cylindrical conductor 269 which is bent inwardly to provide the annular electrode 270 which is disposed opposite to the electrode 267. The annular electrode 265 is directly opposite the annular electrode 265a. FIG. 52 is a diagrammatic and for simplicity shows the lead and the electrode as a single element, it being understood however, that the electrodes may be formed of material other than that of the lead.

The connections of the leads to driving circuits will be described later on. The spaces not occupied by electrodes are filled with an insulating material to form a hollow cylindrical enclosure containing a gas or gases. If currents flow in the directions indicated by the arrows, a magnetic field is produced which is directed in the clockwise direction (looking downwards). This exerts an inwardly directed Lorentz force on electric discharges directed downwards. The result is that the plasma or ionized gas behind converging cylindrical shocks is further heated and accelerated towards the center. This type of device may be used either as a new means of generating single cylindrical shocks or as cylindrical periodic shock wave generator analogous to the aeromagnetic macrosonic generators described previously. However, to avoid the tendency of the discharge to take place all in one spot, various modifications of the general design described above can be made.

(a) One adaptation is to slice one or both sets of electrodes and leads pie-fashion filling in the intervening spaces with insulating material and connecting the leads to each of the resulting pairs of electrodes to an independent condenser bank. This results in a cylindrical array of electrodes of the form shown in FIG. 20.

(b) The axially symmetric outer lead and upper rim electrode 265 (FIG. 42) may be left undivided while the lower rim electrode 265a is divided into a cylindrical array of mutually insulated rods. Each of the lower electrodes may then be connected to one side of independent condenser banks, while the other sides of the condenser banks are connected in common to the continuous upper electrode 265. In this and other designs the leads may be extended so that they form condensers which may be incorporated in the driving circuits.

(c) A plurality of N floating electrodes 275 like the one shown in FIG. 48 may be employed, with electrodes 276, 277 and leads 276a, 277a like those of FIG. 20 at each end of the array, to form a series-connected set of N+1 gaps. Sets like this (278) and their mirror images, 279, 280, as in FIG. 49 may be distributed alternately around the rim 268 of the cylinder (FIG. 42). The placement of three two-gap sets is indicated in FIG. 49. Adjacent leads should always, of course, have the same polarity.

(d) In order to help stabilize synchronization, spark gaps of any one of the sets described in (c) may be dispersed symmetrically about the entire rim 26 of the cylinder, with symmetrically placed gaps of other circuits intervening. Such an arrangement of two two-gap circuits 281, 282, is indicated schematically in FIGS. 50, 50A. Then, if the cylindrical shock were displaced off center to the right (say), firing of the gap 283 on the right would be delayed until arrival of the shock and subsequent ionization of the gas on the left had sufficiently lowered the resistance of the whole circuit 281. Of course, this example only illustrates the mechanism; in actual practice a much greater number of more closely spaced gaps would be employed.

(e) Electrodes at the axis of the cylinder (FIG. 42) can be employed to produce a hot zone to be bombarded by shocks as discussed with relation to FIGS. 36 and 37, or the axial discharge may be pulsed in synchronism with the shock. In the latter case, the axially symmetric arrangement of electrodes shown in FIG. 41 may be used.

(f) Around concentric circles intermediate between the axis 261 and the rim 268 (FIG. 42), a symmetric distribution of additional electrodes 265, 265a with leads 263, 263a having the geometry indicated in FIGS. 51, 51A may be used as intermediate inward-driving cells. As with the rim electrodes described in (a), each pair of electrodes should be connected to an independent condenser bank. Such an array is obtained by slicing the continuous axially symmetric driving cell shown in FIG. 42 pie-fashion as was done in the case of the rim electrodes described in (a).

(g) As in (b), one set of intermediate electrodes and the leads may remain unsliced to form a continuous axially symmetric structure connected in common with one side of all of the condenser banks supplying the cells.

(h) The leads to intermediate outward-driving cells corresponding to (f) should have the geometry shown in FIGS. 52, 52A. If the currents are directed as indicated by the arrows (52a), the field has a counter-clockwise direction (looking downwards) with the result that the plasma in the region of the electric discharge is impelled outwards.

(i) One of the sets of electrodes and leads described in (h) may be in the form of a continuous axially symmetric structure as in (g).

(j) In any intermediate driving cell series-connected circuits of elements like those described in (f) and (h) may be distributed symmetrically about the circle with elements of similar series-connected circuits intervening in manner discussed in (d) in connection with the rim electrodes. This would tend to stabilize the cylindrical shock, portions traveling too fast having to wait for other portions to catch up before being intensified.

(k) Concentric circular loops or spiral coils, energized in the same manner as the longitudinal field producing circuits may be placed parallel to the flat walls 264, 264a (FIG. 42) of the cylindrical generator to produce radially directed magnetic fields for the purpose of pinching the plasma away from the walls. It may be advantageous to have the currents so directed that the field near one wall is directed inward while that of the other is directed outward, in order to produce a steeper field gradient near the walls. These spirals or loops could be combined with previously described cells in the following ways:

(l) Leads to the electrodes 242 (FIG. (41) at the axis discussed in (e) may be twisted in the form of flat spirals lying parallel to and abutting the wall 264a (FIG. 42) in the neighborhood of the axis. In the event electrodes of the type shown in FIG. 41 are used, the lead 240 to the central electrode would be as before, while a portion of the leads to the outer electrodes 242 would spiral as indicated in FIGS. 53, 53A. Such an arrangement would produce a component of magnetic field in the radial direction as well as in the clockwise (or counter-clockwise) direction.

The spiral portions 280 connect with the downwardly directed straight portions 281 and the upwardly directed portions 282 which continue straight through the wall 264a connecting with the electrodes within the cylinder (FIG. 42).

(m) The portion of the leads 263, 263a to the electrodes of the intermediate driving cells (FIGS 51 and 52) which lie in a plane parallel to the walls 264, 264a, instead of being directed radially, may be inclined at an angle to the radii (but still lying in the same plane). Such an arrangement would produce a component of magnetic field in the radial direction as well as one in the clockwise (or counter-clockwise) direction.

(n) FIGS. 54, 54A and 55, 55A indicate schematically two ways of connecting elements of the innermost inward-driving cell in series with the central electrode 285. In both, the gas near the center is pre-heated by the discharge at the center before the shock converges on it. In the arrangement of FIGS. 54, 54A, the discharges in the elements of the driving cells produce a field which causes a further radial pinching of the axial discharge.

SHOCK CASCADES

FIG. 57 illustrates schematically what may be called a "shock cascade." A sequence of equal masses 290, 291, 292, 292a, 292b are so mounted as to be capable of longitudinal translatory movement. These are connected together with non-linear or non-Hookean springs 293, 294, 294a, 294b and 294c of the "hard" type, that is, springs which resist compression with a force whose rate of increase with compression is not constant (as in the case of linear springs which obey Hooke's law), but itself increases with compression. The mass 295 at one end of the line may incorporate a hammer head or bit (not shown) to be held against an object to be pounded. If then the mast 290 at the other end is caused to oscillate with the resonant frequency of the system by any suitable means, a periodic "shock" will sweep back and forth through the system analogous to the periodic shocks which occur in gas-filled macrosonic generators. In such a shock a number of mass elements will be very close to, or actually contiguous with one another.

In the above described shock cascade the driven end 290 exerts the same type of pounding on the driving mechanism as the other end 295 does on the object to be pounded. The difficulty may be overcome by employing a sequence of successively heavier masses as the end 295 is approached, or successively stiffer springs as the end 290 is approached, or both. This arrangement may be called a "beach wave" type of shock cascade, as the wave velocity decreases toward the end 295 analogous to the manner in which the velocity of long water waves decrease as the shore is approached from deep to shallow water. As in the case of such water waves, mechanical waves excited by oscillations of the mass element 290 at one end of the cascade will "break" into shocks as the other end 295 is approached. After reflection at the end 295, the waves will be smoothed out into continuous waves before the driven end 290 is reached. Thus the driving mechanism is smoothly loaded throughout the cycle with no sharp impacts. The work done by the driving mechanism over a whole cycle is stored by the system, concentrated, and delivered all at once at the end 295 in the form of a sharp impact, or literally, a "breaker." The operation and advantages of this device can be visualized by recalling the destructive hammering suffered by a small boat dragged up only half out of the shallow water on a beach, while if it is anchored farther out in the deep water, it easily rides the long smooth waves before they break. In other words, violent mechanical stresses are exerted against what one desires to hammer—not against parts of the tool itself.

In the "beach wave" type of cascade the springs 293, 294, 294a, 294b, 294c may be of the linear or Hookean type.

If, instead of being mounted as before, the mass elements 290, 291, 292, 292a, 292b and 295 of FIG. 57 are all mounted so as to be capable of rotary movement and coupled with torsional springs 293, 294, 294a 294b, 294c shown diagrammatically in FIG. 57, which resist torsion, an entirely new phenomenon which may be called "periodic torsional shocks" may be excited in the system in the manner to be described. If the masses 290, 291, 292, 292a, 292b, 295 are all equal and are coupled with non-linear "hard" springs 293, 294, 294a, 294b, 294c of equal strengths, and if the mass element 295 at one end is held rigidly or nearly rigidly, then if the mass element 290 at the other end is caused, by any suitable means, to execute rotational oscillations at the resonant frequency (like the rotational oscillations of rotary clock pendulums), a "torsional shock" will sweep periodically back and forth through the system. In such a shock adjacent mass elements will have an extreme rotational displacement from equilibrium. Thus, the output of the device at the end 295 would be a sequence of sudden wrenches. As in the longitudinal cascade, a sequence of mass elements whose moments of inertia increase successively at the end 295 is approached, may be employed, or a sequence of successively stiffer springs as the end 290 is approached, or both. This would result in what might be called a "beach wave type of torsional shock cascade." In this device sudden wrenches would occur only at the end 295 and not at the driven end 290. The end element 295 may be provided with a bit (not shown) for use in drilling operations.

Longitudinal and torsional shock cascades may be combined by mounting the mass elements 290, 291, 292, 292a, 292b, 295 so as to be capable of both longitudinal and rotary motion and coupling them with both longitudinal and rotary springs. If then the mass element at the end 290 were caused to execute both translatory and rotary oscillations of the appropriate frequencies, periodic shocks of both the longitudinal and the torsional types would be excited in the system. In drilling operations the forward thrust of the terminal element 295 could be timed to come shortly before the wrench, thus adding considerable "bite" to the bit.

If the mass elements 290, 291, 292, 292a, 292b, 295 of FIG. 57 are mounted so as to permit lateral movements and coupled with appropriate springs 293, 294, 294a, 294b, 294c to resist such laterial movements relative to one another, periodic "shear shocks" could be excited in the system through forced lateral oscillations of the element 290 at one end. Such a device could periodically deliver highly concentrated transverse shearing stresses at the other end 295.

All three types of device—the longitudinal, the torsional, and the shearing shock cascades—could be used to excite these various types of wave in the earth's crust for use in geophysical prospecting.

Designed according to the principle described above, pile drivers, mechanical hammers, drills, etc., can all be made lighter, more efficient and more portable. The longitudinal shock cascade could be used to induce strong periodic shocks in liquids, for instances, in the liquid-filled chambers of the devices shown in FIGS. 2, 4, and 44.

In the specifications and claims the term "insonation system" has reference to a system in which sound is generated and/or transmitted into or through an elastic medium to produce physical, chemical or physico-chemical effects upon a substance or substances.

Where the term substance is used it has reference to a single substance or a combination of substances to be acted upon within the insonation system.

I claim:

1. A device for producing effects of the character described upon a substance to be acted upon by sound waves, said device comprising a generator for producing a large-amplitude periodically reinforced non-linear shock wave, a duct connected to said generator for containing a sonic-wave conducting medium, a chamber connected to said duct adapted to be partially filled with said substance to be acted upon by said sound waves and thus providing a space for said conducting medium, inlet means in said chamber for introducing said substance, means in said space for changing the direction of the generated periodic shock wave produced by said generator and for converting the planar periodic shock wave into a converging cylindrical periodic shock wave to act upon said substance in said chamber, and outlet means in said chamber for discharging the resultant product produced from said substance.

2. A device according to claim 1, wherein a second generator for producing large-amplitude non-linear periodically reinforced shock waves is connected to said chamber at a point remote from said duct, and a second means is provided in that portion of said chamber containing said substance for changing the direction of the generated shock wave produced by said second generator and for converting said last mentioned planar periodic shock wave into a converging cylinderical periodically reinforced shock wave to act upon said substance in said chamber.

3. Method for periodically intensifying large-amplitude periodically reinforced non-linear sound waves by ionizing a sound-conducting medium and acting on the electrically charged particles thereof with magnetic and electric fields thereby inducing periodically such thermal and overall translatory motions of said charged particles as will intensify said large-amplitude sound waves.

References Cited in the file of this patent

UNITED STATES PATENTS

| | | |
|---|---|---|
| 2,351,163 | Thomas | June 13, 1944 |
| 2,369,020 | Clark | Feb. 6, 1945 |
| 2,578,505 | Carlin | Dec. 11, 1951 |
| 2,632,634 | Williams | Mar. 24, 1953 |
| 2,647,846 | Bagno | Aug. 4, 1953 |
| 2,666,632 | Culver | Jan. 19, 1954 |
| 2,693,943 | Fowle | Nov. 9, 1954 |
| 2,738,172 | Spiess | Mar. 13, 1956 |
| 2,831,785 | Kearney | Apr. 22, 1958 |
| 2,845,077 | Branson | July 29, 1958 |
| 2,860,646 | Zucker | Nov. 18, 1958 |
| 2,888,939 | Nitsche | June 2, 1959 |
| 2,919,215 | Neuhaus | Dec. 29, 1959 |